US009338565B2

(12) United States Patent
Hansen

(10) Patent No.: US 9,338,565 B2
(45) Date of Patent: May 10, 2016

(54) LISTENING SYSTEM ADAPTED FOR REAL-TIME COMMUNICATION PROVIDING SPATIAL INFORMATION IN AN AUDIO STREAM

(71) Applicant: Oticon A/S, Smørum (DK)

(72) Inventor: Peter S. K. Hansen, Smørum (DK)

(73) Assignee: OTICON A/S, Smorum (DK)

( * ) Notice: Subject to any disclaimer, the term of this patent is extended or adjusted under 35 U.S.C. 154(b) by 775 days.

(21) Appl. No.: 13/652,960

(22) Filed: Oct. 16, 2012

(65) Prior Publication Data

US 2013/0094683 A1 Apr. 18, 2013

Related U.S. Application Data

(60) Provisional application No. 61/547,773, filed on Oct. 17, 2011.

(30) Foreign Application Priority Data

Oct. 17, 2011 (EP) ..................................... 11185453

(51) Int. Cl.
*G06F 17/00* (2006.01)
*H04R 25/00* (2006.01)
(Continued)

(52) U.S. Cl.
CPC .............. *H04R 25/552* (2013.01); *G09B 21/04* (2013.01); *H04R 5/04* (2013.01); *H04R 25/554* (2013.01);
(Continued)

(58) Field of Classification Search
CPC .... G09B 21/04; H04R 25/552; H04R 25/554; H04R 5/04; H04R 2225/55; H04R 2420/07; H04R 2420/01; H04S 7/304
See application file for complete search history.

(56) References Cited

U.S. PATENT DOCUMENTS 5,144,675 A 9/1992 Killion et al.
5,473,701 A 12/1995 Cezanne et al.
(Continued)

FOREIGN PATENT DOCUMENTS

EP 0746960 B1 8/1999
EP 1460769 B1 4/2007
(Continued)

OTHER PUBLICATIONS

Affes et al., "A signal Subspace Tracking Algorithm for Microphone Array Processing of Speech," IEEE Transactions on Speech and Audio Processing, vol. 5, No. 5, Sep. 1997, pp. 425-437.

*Primary Examiner* — Fan Tsang
*Assistant Examiner* — Eugene Zhao
(74) *Attorney, Agent, or Firm* — Birch, Stewart, Kolasch & Birch, LLP

(57) ABSTRACT

A binaural listening system comprises first and second listening devices adapted for being located at or in left and right ears, respectively, of a user, the binaural listening system being adapted for receiving a wirelessly transmitted signal comprising a target signal and an acoustically propagated signal comprising the target signal as modified by respective first and second acoustic propagation paths from an audio source to the first and second listening devices. Spatial information is provided to an audio signal streamed to a pair of listening devices of a binaural listening system. The first and second listening devices each comprise an alignment unit for aligning the first and second streamed target audio signals with the first and second propagated electric signals in the first and second listening devices, respectively, to provide first and second aligned streamed target audio signals in the first and second listening devices, respectively.

23 Claims, 10 Drawing Sheets

(51) Int. Cl.
*G09B 21/04* (2006.01)
*H04R 5/04* (2006.01)
*H04S 7/00* (2006.01)

(52) U.S. Cl.
CPC ......... *H04R 2225/55* (2013.01); *H04R 2420/07* (2013.01); *H04S 7/304* (2013.01); *H04S 2420/01* (2013.01)

(56) References Cited

U.S. PATENT DOCUMENTS

| | | | |
|---|---|---|---|
| 6,778,774 B2 * | 8/2004 | Saito et al. | 396/311 |
| 9,215,535 B2 * | 12/2015 | Oesch | H04R 25/552 |
| 2003/0231773 A1 | 12/2003 | Drtina | |
| 2008/0170730 A1 | 7/2008 | Azizi et al. | |
| 2009/0052703 A1 | 2/2009 | Hammershoi | |
| 2013/0259237 A1 * | 10/2013 | Oesch et al. | 381/2 |

FOREIGN PATENT DOCUMENTS

| | | |
|---|---|---|
| EP | 1981253 A1 | 10/2008 |
| EP | 2031418 A1 | 3/2009 |
| EP | 2088802 A1 | 8/2009 |
| WO | WO 99/09786 A1 | 2/1999 |
| WO | WO 03/081947 A1 | 10/2003 |
| WO | WO 2005/032209 A2 | 4/2005 |
| WO | WO 2005/052911 A1 | 6/2005 |
| WO | WO 2008/144784 A1 | 12/2008 |
| WO | WO 2009/135872 A1 | 11/2009 |
| WO | WO 2010/133246 A1 | 11/2010 |
| WO | WO 2011/015675 A2 | 2/2011 |

* cited by examiner

LISTENING SYSTEM ADAPTED FOR REAL-TIME COMMUNICATION PROVIDING SPATIAL INFORMATION IN AN AUDIO STREAM

CROSS REFERENCE TO RELATED APPLICATIONS

This nonprovisional application claims the benefit of U.S. Provisional Application No. 61/547,773 filed on Oct. 17, 2011 and to patent application Ser. No. 11/185,453.5 filed on Oct. 17, 2011 in Europe. The entire contents of all of the above applications is hereby incorporated by reference.

TECHNICAL FIELD

The present application relates to a method of enhancing a user's perception of an audio signal in connection with the wireless (electromagnetic) propagation of the audio signal to listening devices of a binaural listening system. The disclosure relates in particular to the perception by the person wearing the binaural listening system of the localization of sound sources.

The application further relates to a method and to an audio processing system. The application further relates to a data processing system comprising a processor and program code means for causing the processor to perform at least some of the steps of the method and to a computer readable medium storing the program code means.

The disclosure may e.g. be useful in applications comprising simultaneous acoustic propagation and wireless transmission of an audio signal to an audio receiving device, e.g. for use in hearing aids, headsets, earphones, active ear protection systems, security systems, classroom amplification systems, etc.

BACKGROUND

An audio stream to a person wearing a listening device is in some cases related to a device with a physical location (e.g. a TV), where the streaming audio is also presented acoustically (e.g. by the loudspeaker in the TV). When a person receives a wirelessly transmitted audio signal, however, no directional cues related to the physical location of the person relative to the audio source from which the audio signal originates is conveyed to the person.

WO 2010/133246 A1 deals in general with signal enhancement in listening systems. Embodiments of the invention relate to the handling of delay differences between acoustically propagated and wirelessly transmitted audio signals. Embodiments of the invention deal with the treatment of audio signals, which are to accompany video-images or real ('live') images of persons or scenes to be simultaneously perceived by a viewer. The idea is—in addition to the acoustically propagated audio signal—to wirelessly transmit (stream) the audio signal from an audio source, e.g. a TV-set or a wired or wireless microphone, to an audio receiver, e.g. a hearing aid.

WO 2011/015675 A2 deals with a system for providing hearing assistance system for wireless RF audio signal transmission from at least one audio signal source to ear level receivers of a user, wherein a close-to-natural hearing impression is aimed to be achieved. In an embodiment, angular localization of a transmission unit is estimated by measuring the arrival times of the RF signals and additionally of the sound generated by the speaker's voice using the respective transmission unit with regard to the right ear and left ear receiver units.

SUMMARY

In real-time communication scenarios as e.g. illustrated in FIG. 1-3, it may be desirable to present the streaming audio for the listener including the cues indicating a spatial direction of the speaker relative to the audio transmitting device to maintain normal directional information regarding the relative position of audio source and listener.

An object of the present application is to provide a scheme for providing spatial information to an audio signal streamed to a pair of listening devices of a binaural listening system.

Thus, it may be desirable to dynamically provide the relative spatial location of the audio transmitting device in the presented stream, when the listener walks around or turns the head. Such spatial cues may advantageously be made available to the user in a special mode of the system, e.g. selectable by the user, or automatically selected depending on the current acoustic environment.

It may also be desirable to present the stream in a way that eases the understanding for the hearing impaired and makes it easier to have simultaneous conversations with nearby persons.

Objects of the application are achieved by the invention described in the accompanying claims and as described in the following.

A Binaural Listening System:

In an aspect of the present application, an object of the application is achieved by a binaural listening system comprising first and second listening devices adapted for being located at or in left and right ears, respectively, of a user, the binaural listening system being adapted for receiving a) a wirelessly transmitted signal comprising a target signal of an audio source and b) an acoustically propagated signal comprising the target signal as modified by respective first and second acoustic propagation paths from the audio source to the first and second listening devices, respectively, the first and second listening devices each comprising an input transducer for converting received propagated first and second acoustic signals to first and second propagated electric signals in said first and second listening devices, respectively, each of the received propagated acoustic signals comprising the target signal and possible other sounds from the environment; the first and second listening devices each comprising a wireless receiver for receiving the wirelessly transmitted signal and for retrieving a first and second streamed target audio signal comprising the target audio signal from the wirelessly received signal in the first and second listening devices, respectively; the first and second listening devices each comprising an alignment unit for aligning the first and second streamed target audio signals with the first and second propagated electric signals in the first and second listening devices, respectively, to provide first and second aligned streamed target audio signals in the first and second listening devices, respectively.

An advantage of the present invention is that it provides spatial cues to a wirelessly transmitted audio signal.

The term 'aligning' in relation to the streamed target audio signal and the propagated electric signals is in the present context taken to mean 'alignment in time', the aim of the alignment being that the difference in time of arrival between the acoustically propagated signal at the first and second listening devices ($\Delta T_{ac} = T_{ac,1} - T_{ac,2}$) is transferred to the streamed target audio signals received (simultaneously) in the first and second listening devices before being presented to a user.

In case the wirelessly transmitted signal 'arrives' before the acoustically propagated signal at both ears/listening devices (as illustrated in FIG. 3b), it is only necessary to appropriately delay the wirelessly received signal in the two listening devices (i.e. it is not necessary to exchange information between the two listening devices) to provide the spatial cues (with a delay of $(T_{ac,left}-T_{radio})$ and $(T_{ac,right}-T_{radio})$ in the left and right listening devices, respectively, possibly with an additional EXTRA identical predefined delay ($\Delta T_{ex}$) in both listening devices, if necessary). The term 'arrives' is in the present context taken to mean 'provided as (comparable) electrical signals in the listening device'.

In an embodiment, the alignment units of the first and second listening devices are adapted to decide whether the wirelessly transmitted signal 'arrives' before the acoustically propagated signal, termed the WLbAC-criterion. In an embodiment, the first and second listening devices are adapted to exchange information as to whether WLbAC criterion is fulfilled in the respective listening devices. In an embodiment, the first and second listening devices are adapted operate independently, if the WLbAC-criterion is fulfilled at both devices. Thereby data exchange between first and second listening devices can be minimized to the case where the WLbAC-criterion is NOT fulfilled at both listening device simultaneously.

In an embodiment, the alignment units of the first and second listening devices are adapted to provide the respective aligned streamed target audio signals as output signals. In an embodiment, the alignment units of the first and second listening devices are adapted to provide the respective propagated electric signals as output signals.

In an embodiment, a listening device of the binaural listening system (such as the first and second listening devices) comprises an output transducer for presenting an output signal to the user, e.g. the aligned streamed target audio signal or a signal originating therefrom (e.g. a further processed version) to the user. In an embodiment, the listening device comprises an output transducer for converting an electric signal to a stimulus perceived by the user as an acoustic signal. In an embodiment, the output transducer comprises a number of electrodes of a cochlear implant or a vibrator of a bone conducting hearing device. In an embodiment, the output transducer comprises a receiver (speaker) for providing the stimulus as an acoustic signal to the user.

In an embodiment, the first and second listening devices of the binaural listening system comprise a memory wherein a model of the head related transfer functions (HRTF's) of the user (or of a standard user) is stored. In an embodiment, the head related transfer functions are applied to the aligned streamed target audio signal or a signal originating therefrom before being presented to the user. This has the advantage of adding frequency dependent spatial cues to the wirelessly received audio signal.

In an embodiment, the first and second listening devices of the binaural listening system comprise a selector unit for selecting either of the propagated electric signal and the aligned streamed target audio signal as an output signal.

In an embodiment, the first and second listening devices of the binaural listening system comprise a mixing unit for mixing the propagated electric signal and the aligned streamed target audio signal and to provide a mixed aligned signal as an output signal. In an embodiment, the aligned streamed target audio signal is mixed (e.g. by addition) with an attenuated version of the propagated electric signal. This has the advantage of adding room ambience to the streamed target audio signal before it is presented to the user.

The required direction of arrival (DOA) information can e.g. be obtained using the delay difference between the acoustic path to the left and the right ear. In the scenarios shown in FIG. 1-3, the DOA estimation problem becomes very simple since both hearing instruments have access to a common reference signal (the source) delivered by the radio path. Thus, the DOA parameter is obtained by correlating the signal from the radio path with the one from the acoustic path in both HI's, resulting in two dual path delay differences, and then subtract those two figures. It should be emphasized that (radio path) access to the source signal makes the DOA estimation very robust in both reverberant and multiple talker environments (it is not a blind DOA problem). The streaming audio signal should preferably also be time synchronized with the one from the acoustical input.

Preferably, the presentation of the wirelessly received signal is synchronized in the first (e.g. left) and second (e.g. right) listening devices (preferably having less than 10 μs static timing offset). Approximately 100 μs timing offset corresponds to 10 degree spatial offset (0 degree is straight ahead), and approximately 700 μs timing offset corresponds to 90 degree spatial offset (in the horizontal plane). In other words, preferably the clocks of the first and second listening devices are synchronized, so that the delay differences ($\Delta T_{left}=T_{ac,left}-T_{radio}$ and $\Delta T_{right}=T_{ac,right}-T_{radio}$, respectively) between the streamed target audio signal and the propagated electric signal, as determined in the first and second listening devices have the same absolute basis clock (e.g. that $T_{radio}$ in the first and second listening devices correspond to the same point in time, as e.g. defined by a radio time signal (e.g. DCF77 or MSF or a time signal from a cell phone), or a synchronized clock between the two listening devices established via a connection between them).

Preferably, each of the first and second listening devices are adapted to determine a delay between a time of arrival of the first, second streamed target audio signals and the first, second propagated electric signals, respectively. In an embodiment, the delay differences are determined in the alignment units of the respective listening devices.

In an embodiment, the delay differences in the first and second listening devices are determined in the frequency domain based on a sub-band analysis. Thereby accuracy can be significantly improved (see. e.g. [Wang et al., 2006] or US 2009/052703 A1). In the time domain, a digital signal x(n−k) expresses a delay of k time instances of a signal x(n), where n is a time index. In the frequency domain such delay is expressed as $X(\omega)e^{-j\omega k}$, where $X(\omega)$ is a Fourier transform of x(n) and ω is angular frequency (2πf). In an embodiment, the delay differences are determined using a cross-correlation algorithm, wherein the delay can be determined as a maximum phase of the cross-correlation $R_{xy}$ between two signals x and y.

In an embodiment, the binaural listening system is adapted to establish a (interaural) communication link between the first and second listening devices to provide that information (e.g. control and status signals (e.g. information of lag between the propagated and streamed signals), and possibly audio signals) can be exchanged or forwarded from one to the other. In an embodiment, the delay differences are determined in one or more predetermined frequency ranges, where directional cues are expected to be present (critical frequency bands). Thereby calculations can be simplified. In an embodiment, interaural time delay (ITD) is determined within each critical frequency band.

In an embodiment, the binaural listening system further comprises an auxiliary device. In an embodiment, the system is adapted to establish a communication link between one of the (or both) listening device(s) and the auxiliary device to provide that information (e.g. control and status signals, and possibly audio signals) can be exchanged or forwarded from one to the other. In an embodiment, the auxiliary device acts as an intermediate device between a transmitter of the wirelessly transmitted signal and the listening devices of the binaural listening system, in which case, the auxiliary device is adapted to receive the wirelessly transmitted signal comprising a target signal and transmit or relay it (or at least the streamed target audio signal) to the first and second listening devices.

In an embodiment, the first and second listening devices comprise an antenna and transceiver circuitry for receiving a wirelessly transmitted signal from the respective other listening device and/or from an auxiliary device (the auxiliary device being a device other than the one transmitting a signal comprising the target audio signal). In an embodiment, the listening devices are adapted to retrieve one or more of an audio signal, a control signal, an information signal, and a processing parameter of the listening device from the wirelessly received signal from the other listening device of the binaural listening system or from the auxiliary device.

In an embodiment, the auxiliary device comprises an audio gateway device adapted for receiving a multitude of audio signals (e.g. from an entertainment device, e.g. a TV or a music player, a telephone apparatus, e.g. a mobile telephone or a computer, e.g. a PC) and adapted for allowing a user to select and/or combine an appropriate one of the received audio signals (or combination of signals) for transmission to the listening device. In an embodiment, the auxiliary device comprises a remote control of the listening devices of the binaural listening system.

In an embodiment, the listening device(s) and/or the auxiliary device is/are a portable device, e.g. a device comprising a local energy source, e.g. a battery, e.g. a rechargeable battery.

In an embodiment, the listening device is adapted to process an input audio signal to provide an enhanced output signal to a user. In an embodiment, the listening device is adapted to provide a frequency dependent gain to compensate for a hearing loss of a user. In an embodiment, the listening device comprises a signal processing unit for processing an input signal and providing an enhanced output signal. In an embodiment, the listening device comprises a hearing aid, a headset, an ear phone or headphone, an active ear protection system, or a combination thereof. Various aspects of digital hearing aids are described in [Schaub; 2008].

In an embodiment, the input transducer of a listening device comprises a directional microphone system adapted to separate two or more acoustic sources in the local environment of the user wearing the listening device. In an embodiment, the directional system is adapted to detect (such as adaptively detect) from which direction a particular part of an acoustic input signal originates. This can be achieved in various different ways as e.g. described in U.S. Pat. No. 5,473,701 or in WO 99/09786 A1 or in EP 2 088 802 A1.

In an embodiment, the listening device comprises an element for attenuating an acoustically propagated sound into the ear canal of a user wearing the listening device (e.g. through a vent or other opening between the listening device and the walls of the ear canal). The acoustically propagated sound can e.g. be prevented from (or at least attenuated before) reaching a user's ear drum by mechanical means. Alternatively, active electronic means can be used for this purpose (see e.g. WO 2005/052911 A1).

In an embodiment, the wireless receivers of the first and second listening devices (and/or the auxiliary device) each comprise an antenna and transceiver circuitry for receiving the wirelessly transmitted signal. In an embodiment, the listening device (and/or the auxiliary device) comprises demodulation circuitry for demodulating a wirelessly received signal to retrieve a streamed target audio signal from the wirelessly received signal. In an embodiment, the listening device (and/or the auxiliary device) is further adapted to retrieve a control signal, e.g. for setting an operational parameter (e.g. volume), an information signal (e.g. a delay difference), and/or a processing parameter of the listening device.

In general, the wireless link established by a transmitter transmitting the target (audio) signal and the receiver of the listening device (and/or the auxiliary device, and or between the first and second listening device, and/or between the auxiliary device and the listening device(s)) can be of any type. In an embodiment, the wireless link is a link based on near-field communication, e.g. an inductive link based on an inductive coupling between antenna coils of transmitter and receiver parts of the system. In another embodiment, the wireless link is based on far-field, electromagnetic radiation. In an embodiment, the wireless link comprises a first wireless link from a transmitter transmitting the target (audio) signal to an intermediate device and a second wireless link from the intermediate device to one or both listening devices of the binaural listening system. In an embodiment, the first and second wireless links are based on different schemes, e.g. on far-field and near-field communication, respectively. In an embodiment, the communication via the wireless link(s) is/are arranged according to a specific modulation scheme, e.g. an analogue modulation scheme, such as FM (frequency modulation) or AM (amplitude modulation) or PM (phase modulation), or a digital modulation scheme, such as ASK (amplitude shift keying), e.g. On-Off keying, FSK (frequency shift keying), PSK (phase shift keying) or QAM (quadrature amplitude modulation).

In an embodiment, the wireless link(s) (including the link serving the transmitted signal comprising a target signal) is/are based on some sort of modulation, preferably modulated at frequencies above 100 kHz, and preferably below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range.

In an embodiment, the listening device comprises a forward or signal path between the input transducer (microphone system and/or direct electric input (e.g. a wireless receiver)) and an output transducer. In an embodiment, the signal processing unit is located in the forward path. In an embodiment, the listening device comprises an analysis path comprising functional components for analyzing the input signal (e.g. determining directional cues for insertion in the streamed target audio signal, e.g. determining an appropriate alignment delay of a signal to provide that a retrieved streamed target audio signal is aligned with an acoustically propagated electric signal (comprising the target audio signal), determining a level of an input signal, a modulation, a type of signal, an acoustic feedback estimate, etc.). In an embodiment, some or all signal processing of the analysis path and/or the signal path is conducted in the frequency domain. In an embodiment, some or all signal processing of the analysis path and/or the signal path is conducted in the time domain.

In an embodiment, an analogue electric signal representing an acoustic signal is converted to a digital audio signal in an analogue-to-digital (AD) conversion process, where the analogue signal is sampled with a predefined sampling frequency or rate $f_s$, $f_s$ being e.g. in the range from 8 kHz to 40 kHz (adapted to the particular needs of the application) to provide digital samples $x_n$ (or x[n]) at discrete points in time $t_n$ (or n), each audio sample representing the value of the acoustic signal at $t_n$ by a predefined number $N_s$ of bits, $N_s$ being e.g. in the range from 1 to 16 bits. A digital sample x has a length in time of $1/f_s$, e.g. 50 µs, for $f_s$=20 kHz. In an embodiment, a number of audi samples are arranged in a time frame. In an embodiment, a time frame comprises 64 audio data samples. Other frame lengths may be used depending on the practical application.

In an embodiment, the listening devices comprise an analogue-to-digital (AD) converter to digitize an analogue input with a predefined sampling rate, e.g. 20 kHz. In an embodiment, the listening devices comprise a digital-to-analogue (DA) converter to convert a digital signal to an analogue output signal, e.g. for being presented to a user via an output transducer.

In an embodiment, the alignment unit comprises a memory (buffer) for storing a time sequence of an audio signal (e.g. a number of time frames (e.g. between 1 and 100 or more than 100) of the digitized audio signal, e.g. corresponding to a predefined time, the predefined time being e.g. larger than an estimated maximum delay difference (processing and propagation delay) between the acoustically and wirelessly propagated signals in question for the application envisioned). In an embodiment, a time sequence of the acoustically propagated signal is stored in the memory. In an embodiment, a time sequence of the streamed target audio signal retrieved from the wirelessly received signal is stored in the memory.

In an embodiment, the alignment unit comprises a correlation measurement unit for determining a correlation between two input signals (here the streamed target audio signal and the acoustically propagated signal picked up by the input transducer or signals derived therefrom). Typically, at least one of the input signals to the correlation measurement unit is temporarily stored.

A correlation between the streamed target audio signal and the acoustically propagated signal picked up by the input transducer is in the present context taken to include, a mathematical correlation between electrical representations of the two signals (or signals derived therefrom).

In an embodiment, the correlation is based on the calculation or estimation of the cross-correlation $R_{xy}$ between the streamed target audio signal (x) and the acoustically propagated signal (y):

$$R_{xy} = (x^* y)[k] = \sum_{m=-\infty}^{\infty} x^*[m] \cdot y[k+m]$$

where k and m are time indices, and x* indicates the complex conjugate of x. The time indices are related to the sampling rate $f_s$ of the signals.

Typically, the summation can be limited to a number of time instances corresponding to a time range less than 1 s, such as less than 500 ms, such as less than 200 ms. By varying k (the time lag between the two signals) within predefined limits $[k_{min}; k_{max}]$, the k-value $k_a$ that maximizes cross-correlation can be determined.

In an embodiment, the correlation is based on the calculation of a correlation coefficient, e.g. Pearson's correlation coefficient. Person's correlation coefficient $\rho_{xy}$ for two signals x and y is defined as the covariance cov(x,y) divided by the product of the individual standard deviations $\sigma_x$ og $\sigma_y$:

$$\rho_{xy} = \frac{\text{cov}(x, y)}{\sigma_x \cdot \sigma_y} = \frac{E[(x - \mu_x) \cdot (y - \mu_y)]}{\sigma_x \cdot \sigma_y}$$

where E is the expected value operator and $\mu_x$ is the mean value of x, and $\mu_y$ is the mean value of y. In the present context, the variables x and y are the representations (e.g. digital representations) of the wirelessly received signal and the acoustically propagated signal, respectively, of the listening device. In an embodiment, correlation between the wirelessly received signal (e.g. x) and the acoustically propagated signal (e.g. y) is taken to be present, if the absolute value of Person's correlation coefficient $|\rho_{xy}|$ is in the range from 0.3 to 1, such as in the range from 0.5 to 1, e.g. in the range from 0.7 to 1.

In a preferred embodiment, one or both of the mean values $\mu_x$ and $\mu_y$ of the signals x and y are equal to zero.

In an embodiment, the correlation estimate (including the mean values $\mu_x$ and $\mu_y$ of the signals x and y) is averaged over a predefined time, e.g. a predefined number of samples. In an embodiment, the correlation estimate is averaged over a predefined number of time frames, e.g. over 1 to 100 (e.g. 1-10) time frames. In an embodiment, the correlation estimate is periodically or continuously updated.

In an embodiment, computationally simpler methods of estimating a correlation between the two signals in question can be used, e.g. by operating only on parts of the signals in question, e.g. an envelope (e.g. as given by a Hilbert transform or a low pass filtering of the signals).

In an embodiment, the correlation estimate is determined in one or more particular sub-frequency ranges or bands of the total frequency range considered by the listening device. In an embodiment, the correlation estimate is determined based on a comparison of the levels (e.g. the magnitude) of the signal in said sub-frequency ranges or bands. In an embodiment, the correlation estimate is determined using phase changes of the signals in said sub-frequency ranges or bands.

In an embodiment, frequency ranges or bands of a time frame are ranked according to their energy content, e.g. according to their power spectral density (psd). In an embodiment, the correlation estimate is determined based on a weighting of the contributions from the different frequency ranges or bands of a time frame so that the high energy parts of the signal have the largest weights (e.g. the weights increase with increasing psd). In an embodiment, the correlation estimate is determined based only on the high energy parts of the signal (e.g. those having a psd above a predetermined threshold value, or a predetermined number of frequency ranges or bands (e.g. half of them) of the time frame having the highest psd).

In an embodiment, a listening device comprises a speech detector for detecting whether speech is present in an input signal at a given point in time. In an embodiment, the speech detector is adapted to identify speech components on a band level. In an embodiment, the correlation estimate is determined based on frequency bands wherein speech components have been identified.

In an embodiment, a delay between the two signals for which cross-correlation is to be estimated is varied between a predefined minimum value and a predefined maximum value, such variation being e.g. performed in steps during a calibration procedure and/or during a measurement cycle, e.g. so that a correlation estimate is made for each delay value, and a maximum correlation is determined among the measurements, such delay value being the appropriate time lag k for the current conditions. In an embodiment, a delay value (time lag) determined during a calibration procedure is used, e.g. until a reset has been activated (providing a new delay estimate) or the audio receiving device has been powered off and on. In an embodiment, the calibration procedure for determining a time lag between the signal picked up by the microphone and the wirelessly received signal of the audio receiving device is a part of a power-on procedure. In an embodiment, the calibration procedure is performed repeatedly during use, e.g. periodically, e.g. continuously. In an embodiment, the binaural listening system comprises a user interface (e.g. a remote control or an activation element on one or both listening devices of the system) allowing a user to initiate a delay calibration procedure. In an embodiment, the system and user interface is adapted to allow a user to choose between a calibration procedure starting out from a previously determined delay value and a calibration procedure without such limitation (e.g. starting without prior knowledge of the mutual timing relationship of the wirelessly transmitted and the acoustically propagated signal).

Preferably, the frequency of updating the cross-correlation estimate is adapted to the situation, e.g. via a choice of mode of operation (related to the current acoustic environment, e.g. a relatively stationary or a dynamic environment with respect to relative mobility of audio source(s) and user/listener).

In an embodiment, the correlation estimate has several maxima at different time lags $k_{p0}$, $k_{p1}$, $k_{p2}$, the different maxima corresponding to different propagation paths ($p_0$, $p_1$, $p_2$) of the acoustically propagated signal ($p_1$, $p_2$ corresponding e.g. to echo's of the primary (shortest) propagation path ($p_0$) between the acoustic source and the listener, cf. e.g. FIG. 9). In an embodiment, the binaural listening system is adapted to provide that the time lag corresponding to the primary propagation path ($p_0$), i.e. the largest correlation peak (maximum), is used. In an embodiment, an average of the time lags $k_{p0}$, $k_{p1}$, $k_{p2}$ for maxima of the correlation estimate corresponding to different propagation paths ($p_0$, $p_1$, $p_2$) is used as the resulting time lag k at the current time.

In an embodiment, the system comprises a tracking algorithm adapted for tracking the largest peak (maximum) of the correlation estimate (e.g. corresponding to lag $k_{p0}$ of the direct, shortest propagation path). In an embodiment, the system is adapted to track the peak as long as the peak value fulfils a predefined criterion, e.g. that the peak value is larger than a predefined absolute value or a predefined relative value (e.g. until it has changed to a value <50% of its initial value). The tracking algorithm is advantageously adapted to the typically relatively slow changes to the acoustic propagation paths from source to listener (due to typically relatively slow relative movements between audio source and listener, which furthermore occur within limited boundaries). In an embodiment, a new (independent) correlation procedure (not based on the tracking algorithm) is initiated, if the predefined criterion is no longer fulfilled.

The processing delay and propagation delay of the wirelessly transmitted and acoustically propagated signal may vary according to the practical systems (analogue, digital, amount of processing, e.g. encoding/decoding, etc.) and to the distances between the acoustic source (and wireless transmitter) and the audio receiving device (at a listener). The difference in total delay between a received—wirelessly propagated—and a received—acoustically propagated—signal may vary accordingly. In some applications, e.g. analogue systems, e.g. FM-systems, the wireless propagation and processing delay is relatively short (e.g. less than 10 ms, e.g. less than 7 ms). In some applications, e.g. digital systems, e.g. Bluetooth or DECT or ZigBee systems, the wireless propagation and processing delay is relatively long (e.g. more than 10 ms, e.g. more than 15 ms, e.g. more than 25 ms).

However, due to the relatively slow speed of sound in air (propagation delay ≈3 ms/m), the streaming delay will typically only be critical if the acoustic source (e.g. a speaker speaking into a microphone comprising a wireless transmitter) is close to (within a few meters) the user wearing the binaural listening system (e.g. comprising a pair of hearing instruments).

For a given application, where the details concerning the transmission (frequency, analogue/digital, modulation, transmission range, etc.) and processing and details concerning the possible mutual distances between transmitter and receiver(s) are fixed (or fixed within a certain framework), an estimate of the minimum and maximum possible delay differences between the reception of a wirelessly transmitted and an acoustically propagated version of the same audio signal can be estimated (e.g. in advance of the use of the system). Typically, for a given system, the processing delays are known (at least within limits) and only the propagation delays vary (according to the distances between the sound sources and the user wearing the binaural listening system, which also typically can vary only within certain limits, e.g. limited by the boundaries of a room).

In an embodiment, the binaural listening system is adapted to use the provision of directional cues to the received streamed audio signal in a particular 'add cues' mode of the system, where audio from an audio source (e.g. forming part of a public address system, an entertainment device, e.g. a TV, or a person speaking or singing) located in the vicinity of the user is to be received by the binaural listening system. In an embodiment, the system is adapted to allow such mode to be activated and/or deactivated by the user.

In an embodiment, the system is adapted to allow such mode to be automatically activated and/or deactivated based on predefined criteria, e.g. regarding the correlation of the acoustically propagated signal and the wirelessly received signal (e.g. its stability or time variation).

In an embodiment, the frequency range considered by the listening device from a minimum frequency $f_{min}$ to a maximum frequency $f_{max}$ comprises a part of the typical human audible frequency range from 20 Hz to 20 kHz, e.g. a part of the range from 20 Hz to 12 kHz. In an embodiment, the frequency range $f_{min}$-$f_{max}$ considered by the listening device is split into a number P of frequency bands, where P is e.g. larger than 5, such as larger than 10, such as larger than 50, such as larger than 100, at least some of which are processed individually.

In an embodiment, the listening device comprises a level detector (LD) for determining the level of an input signal (e.g. on a band level and/or of the full (wide band) signal). The input level of the signal picked up by the input transducer from the user's acoustic environment is e.g. a classifier of the environment. The listening device may preferably comprise other detectors for classifying the user's current acoustic environment, e.g. a voice detector, an own voice detector, etc.

In an embodiment, the listening device further comprises other relevant functionality for the application in question, e.g. feedback detection and cancellation, compression, noise reduction, etc.

An Audio Processing System:

In a further aspect, an audio processing system comprising an audio delivery device and a binaural listening system as described above, in the 'detailed description of embodiments' and in the claims is provided, the audio delivery device comprises a transmitter for wirelessly transmitting a signal comprising a target audio signal from an audio source to the binaural listening system, the audio delivery device comprising a transmitter for wirelessly transmitting the signal comprising the target audio signal to the first and second listening devices of the binaural listening system.

In an embodiment, the audio processing system (e.g. the audio delivery device) comprises an output transducer for acoustically propagating the target signal along first and second acoustic propagation paths to the first and second listening devices of the binaural listening system, thereby providing the first and second propagated acoustic signals at the first and second listening devices.

In an embodiment, the audio processing system (e.g. the audio delivery device) comprises a microphone for picking up the target signal.

In an embodiment, the audio processing system comprises an intermediate device for receiving the wirelessly transmitted signal from the audio delivery device and for relaying the signal to the binaural listening system, possibly using another modulation technique or protocol (than the modulation technique or protocol used for the wireless link from the audio delivery device to the intermediate device). In an embodiment, the intermediate device comprises an input transducer and wherein the audio processing system is adapted to control or influence a further processing of the streamed target audio signals or signals derived therefrom based on a signal from the input transducer of the intermediate device.

Use:

In an aspect, use of a binaural listening system as described above, in the 'detailed description of embodiments' and in the claims, is moreover provided. In an embodiment, use is provided in a system comprising audio distribution, e.g. a system comprising a microphone for picking up the target audio signal and a loudspeaker for acoustically distributing the signal picked up by the microphone. In an embodiment, use is provided in a teleconferencing system, a public address system, a karaoke system, a classroom amplification system, or the like.

A Method:

In an aspect, a method of enhancing an audio signal in a binaural listening system comprising first and second listening devices adapted for being located at or in left and right ears of a user is furthermore provided by the present application. The method comprises:

Acoustically propagating a target signal from an acoustic source along first and second acoustic propagation paths to said first and second listening devices, providing first and second propagated acoustic signals at the first and second listening devices, respectively, each of the first and second propagated acoustic signals comprising the target signal as modified by the respective first and second acoustic propagation paths from the acoustic source to the first and second listening devices, respectively, together with possible other sounds from the environment;

Converting the received propagated first and second acoustic signals to first and second propagated electric signals in said first and second listening devices, respectively;

Wirelessly transmitting a signal comprising the target audio signal to the first and second listening devices;

Receiving the wirelessly transmitted signal in the first and second listening devices;

Retrieving a first and second streamed target audio signal from the wirelessly received signal comprising the target audio signal in the first and second listening devices, respectively; and Aligning the first streamed target audio signal with the first propagated electric signal in the first listening device to provide a first aligned streamed target audio signal and aligning the second streamed target audio signal with the second propagated electric signal in the second listening device to provide a second aligned streamed target audio signal.

It is intended that the structural features of the binaural listening system described above, in the 'detailed description of embodiments' and in the claims can be combined with the method, when appropriately substituted by a corresponding process and vice versa. Embodiments of the method have the same advantages as the corresponding devices.

In an embodiment, the method comprises aligning the first (second) streamed target audio signal with the first (second) propagated electric signal in the first (second) listening device to provide a first (second) aligned streamed target audio signal by maximizing the cross-correlation between the first (second) streamed target audio signal and the first (second) propagated electric signal.

In an embodiment, the method comprises buffering at least one of the first streamed target audio signal and the first propagated electric signal.

In an embodiment, the method comprises determining a (second) timing information defining the time difference between the arrival at the second listening device of the second streamed target audio signal and the second propagated electric signal, and transmitting the (second) timing information to the first listening device. In an embodiment, the method comprises determining a (first) timing information defining the time difference between the arrival at the first listening device of the first streamed target audio signal and the first propagated electric signal. In an embodiment, the method comprises transmitting the (first) timing information to the second listening device.

In an embodiment, the method comprises determining a difference in time of arrival of the first and second propagated electric signals at the first and/or second listening devices, respectively.

In an embodiment, the method comprises storing in the first (and/or second) listening device a model of the head related transfer function as a function of the angle to an acoustic source. EP0746960 A1 deals in particular with methods for measurement of Head-related Transfer Functions (HRTF's). Examples of HRTF's can e.g. be found in Gardner and Martin's KEMAR HRTF database [Gardner and Martin, 1994]. In an embodiment, the head related transfer functions of the left and right ears $HRTF_l$ and $HRTF_r$, respectively, are determined during normal operation of the binaural listening system utilizing the simultaneous access to the acoustically propagated signals as received at the left and right ears and the possibility to exchange information between the left ($1^{st}$) and right ($2^{nd}$) listening device.

In an embodiment, the method comprises calculating a contribution from the head related transfer function for the first (and/or second) listening device based on the difference in time of arrival of the first and second propagated electric signals at the first and second listening devices, respectively, or on a parameter derived therefrom.

In an embodiment, the method comprises applying the contribution from the head related transfer function for the first (second) listening device to the first (second) streamed target audio signal to provide an enhanced first (second) streamed audio signal.

In an embodiment, the method comprises converting an electric signal derived from the first (second) streamed audio signal to an output signal perceivable by a user as an acoustic signal.

A Computer Readable Medium:

In an aspect, a tangible computer-readable medium storing a computer program comprising program code means for causing a data processing system to perform at least some (such as a majority or all) of the steps of the method described above, in the 'detailed description of embodiments' and in the claims, when said computer program is executed on the data processing system is furthermore provided by the present application. In addition to being stored on a tangible medium such as diskettes, CD-ROM-, DVD-, or hard disk media, or any other machine readable medium, the computer program can also be transmitted via a transmission medium such as a wired or wireless link or a network, e.g. the Internet, and loaded into a data processing system for being executed at a location different from that of the tangible medium.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

Further objects of the application are achieved by the embodiments defined in the dependent claims and in the detailed description of embodiment.

As used herein, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element or intervening elements may be present, unless expressly stated otherwise. Furthermore, "connected" or "coupled" as used herein may include wirelessly connected or coupled. As used herein, the term "and/or" includes any and all combinations of one or more of the associated listed items. The steps of any method disclosed herein do not have to be performed in the exact order disclosed, unless expressly stated otherwise.

BRIEF DESCRIPTION OF DRAWINGS

The disclosure will be explained more fully below in connection with a preferred embodiment and with reference to the drawings in which.

The figures are schematic and simplified for clarity, and they just show details which are essential to the understanding of the disclosure, while other details are left out. Throughout, the same reference signs are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

Figure 1:
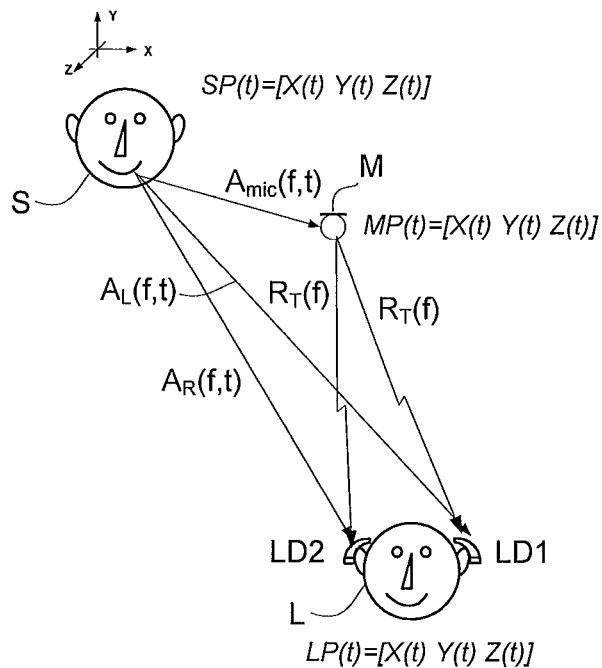
FIG. 1 shows a first application scenario of the present disclosure comprising a speaker, a wireless microphone and a listener wearing a pair of listening devices of a binaural listening system, the microphone transmitting directly to the listening devices.

FIG. 1 shows an application scenario, wherein principles of an audio processing system of the present disclosure can be used. The acoustic signals propagated along the different propagation paths to the left and right listening devices, arrive at the left and right listening devices at times $T_{ac,left}$ and $T_{ac,right}$, respectively. The wirelessly propagated (streamed) signals comprising the target signal picked up by the microphone arrive, on the other hand, practically simultaneously at the left and right listening devices at time $T_{radio}$. The difference $\Delta T$ between the time of arrival of the acoustically propagated and the wirelessly propagated signals at the left and right listening devices, can thus be expressed as $\Delta T_{left} = T_{ac,left} - T_{radio}$ and $\Delta T_{right} = T_{ac,right} - T_{radio}$, respectively. The direction of arrival (DOA) of the target signal can be obtained from the delay difference dT between the acoustic path to the left and the right ear: $dT = T_{ac,left} T_{ac,right} = \Delta T_{left} - \Delta T_{right}$. The delay differences $\Delta T$ between the time of arrival of the acoustically propagated and the wirelessly propagated signals can e.g. be determined in the left and right listening devices by maximizing the cross correlation between the respective acoustically propagated and the wirelessly propagated signals. The absolute delay difference dT between the acoustic path to the left and the right ears (listening devices) can be determined by adapting the listening devices to transfer the delay differences $\Delta T$ between the time of arrival of the acoustically propagated and the wirelessly propagated signals for a given device to the contra-lateral (opposite) device.

Figure 2:
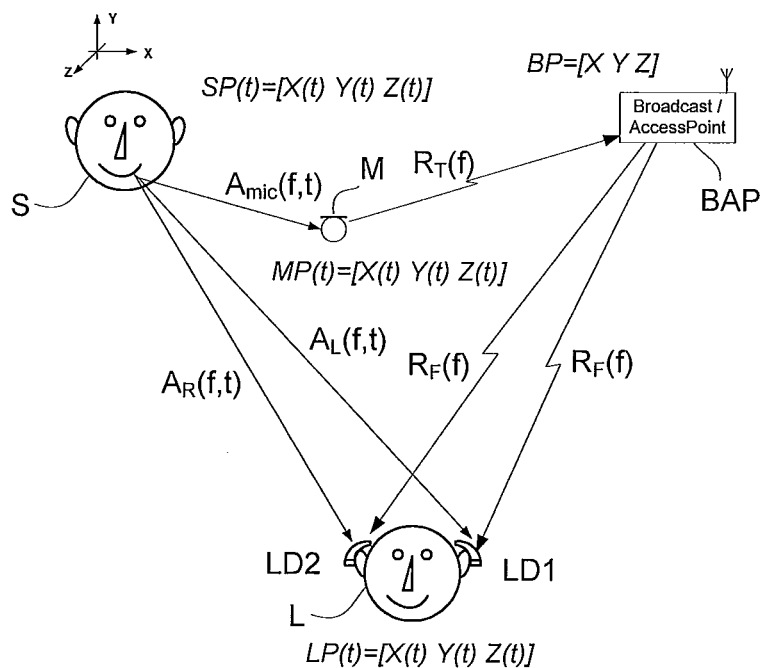
FIG. 2 shows a second application scenario of the present disclosure comprising a speaker, a wireless microphone and a listener wearing a binaural listening system, the microphone transmitting to the listening devices via a broadcast access point.
Figure 3A:
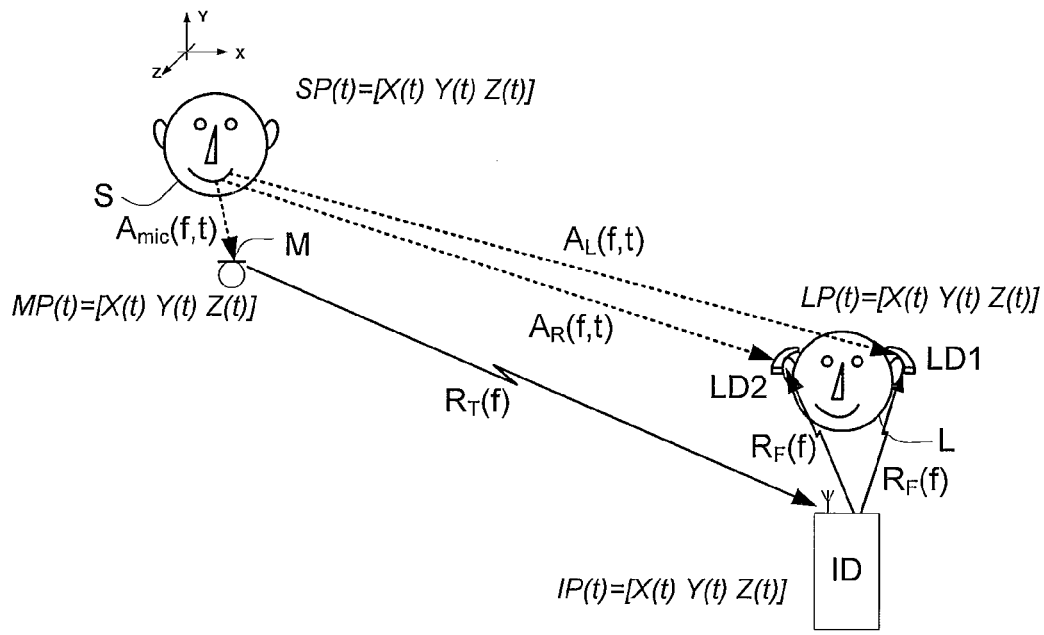
FIG. 3 shows a third application scenario of the present disclosure, FIG. 3a illustrating a scenario comprising a speaker, a wireless microphone and a listener wearing a binaural listening system and an intermediate device, the microphone transmitting to the listening devices via the intermediate device, FIG. 3b illustrating an example of the timing relationship in the listening devices of the wirelessly propagated signal and the acoustically propagated signal.

FIGS. 2 and 3a show an embodiment of an audio processing system comprising a wireless microphone M located at a variable position $MP(t) = [X_m(t), Y_m(t), Z_m(t)]$ (t being time, and X, Y, Z being the coordinates of the position in an xyz-coordinate system) for picking up the voice (mixed with possible noise in the environment of the microphone) of a speaker S located at a variable position $SP(t) = [X_s(t), Y_s(t), Z_s(t)]$, the wireless microphone being adapted to wirelessly transmit the picked up target signal. The location of the wireless microphone M may follow that of the speaker S (if e.g. worn by the speaker). The system may further comprise a broadcast access point BAP located at a fixed position $BP = [X_{bp}, Y_{bp}, Z_{bp}]$ (e.g. at a wall or a ceiling of a room, cf. FIG. 2) and/or an intermediate device ID in a variable position $IP = [X_{ID}(t), Y_{ID}(t), Z_{ID}(t)]$ (cf. FIG. 3a), and adapted for relaying the radio signal from the wireless microphone. The system additionally comprises a pair of listening devices (e.g. hearing aids) worn at the ears of a listener L located at a variable position $LP(t) = [X_l(t), Y_l(t), Z_l(t)]$ and adapted to receive the wirelessly transmitted (audio) signal from the wireless microphone (e.g. directly, via the broadcast access point (FIG. 2) and/or via an intermediate device worn by the listener (FIG. 3a)) as well as the directly propagated audio signal from the speaker (mixed with possible other sounds and acoustic noise from the surroundings of the user). $A_R(f,t)$, $A_L(f,t)$, $A_{mic}(f,t)$ represent acoustic transfer functions from the speaker to the Right hearing instrument, to the Left hearing instrument and to the wireless microphone, respectively. The acoustic transfer functions $A(f,t)$ are dependent on frequency f and time t. The acoustic propagation delay in air is around 3 ms/m (i.e. propagation path of 10 m's length induces a delay of around 30 ms in the acoustically propagated signal). $R_T(f)$ and $R_F(f)$ represent radio transfer functions from the wireless microphone to the broadcast access point and from the broadcast access point to the hearing instruments, respectively (assumed equal for the two left and right HI-positions). The radio transfer functions $R(f)$ are dependent on frequency f but assumed independent of time. The wireless transmission of the target signal from the audio source to the listening device may be based on near-field (e.g. inductive coupling) or far-field techniques or a mixture thereof, and based on standardized or proprietary modulation schemes or protocols.

Figure 3B:
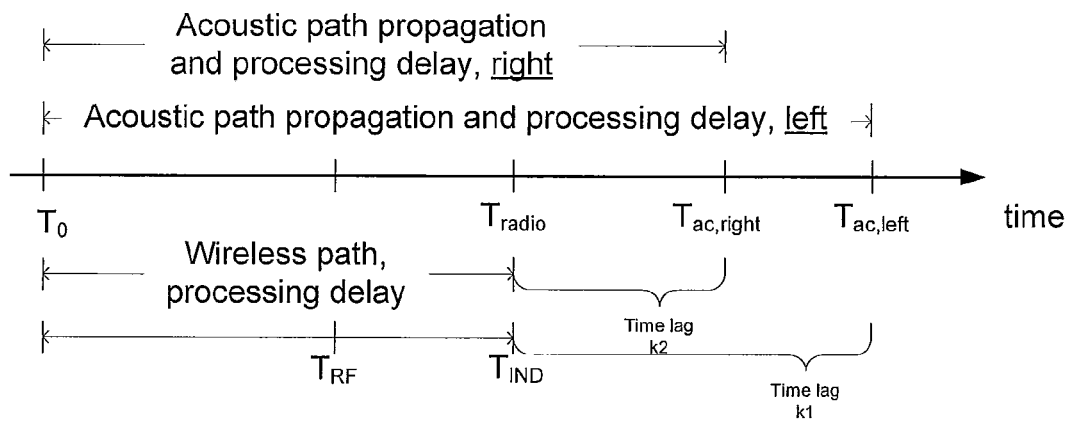

FIG. 3b illustrates an example of the timing relationship in the left and right listening devices (LD1 and LD2, respectively, in FIGS. 1, 2 and 3a), of the wirelessly propagated signal and the acoustically propagated signal. A target signal is assumed to be created and forwarded to a transmitter at time $T_0$. The wirelessly transmitted signal is assumed to be available in both listening devices at the same time instant $T_{radio}$ (after equivalent total processing delays in the transmitter, (optionally in) the intermediate device ID and the two listening devices LD1, LD2, respectively). The wireless path processing delay ($T_{radio} - T_0$) comprises in the configuration of FIG. 3a of delay ($T_{RF} - T_0$) associated with the RF-link from the transmitter (M) to the intermediate device (ID) and a delay ($T_{IND} - T_{RF}$) associated with the link from the intermediate device to the listening devices (LD1, LD2) (the latter being assumed equal). The acoustic path from the speaker S to the right listening device LD1 is shorter than the acoustic path from the speaker S to the left listening device LD2 (with the current position and orientation of the listener L). Times $T_{ac,right}$ and $T_{ac,left}$ indicate times of availability of the acoustically propagated signals in the right (LD1) and left (LD2) listening devices, respectively. The difference in time between the times of availability $T_{ac,right}$ and $T_{ac,left}$ of the acoustically propagated signals in the right (LD1) and left (LD2) listening devices, respectively, and the time of availability $T_{radio}$ in the same devices of the wirelessly received signal are denoted time lags $k_1$ ($= T_{ac,right} - T_{radio}$) and $k_2$ ($= T_{ac,left} - T_{radio}$), respectively, as indicated in the lower part of FIG. 3b. In the example, it is assumed that the sum of the wireless path and processing delays is smaller than any of the sums of acoustic path propagation and processing delays of the left and right listening devices. Alternatively, the acoustic path propagation and processing delays of the left and right listening devices may be smaller than or comparable to the wireless path and processing delay. The relationship in a given situation depends mainly on the processing delay of the wireless link(s) and the distances between source and listener (and of processing delay of the acoustically propagated signals prior to correlation to the wirelessly received signals, e.g. directionality algorithms, etc.).

The intermediate device ID of FIG. 3a may e.g. comprise an audio gateway device adapted for receiving a multitude of audio signals and allowing a user to control which one of the current audio signals to be presented to the user, if any. The audio gateway device may further have the function of a remote control of the listening devices, e.g. for changing program (including e.g. activating of deactivating the application of spatial cues to a wirelessly received audio signal as proposed in the present disclosure) or operating parameters (e.g. volume, cf. Vol-button) in the listening device. The listening devices are shown as devices mounted at the ear of the user (L). The listening devices each comprise a wireless transceiver, e.g. based on inductive communication. The transceiver (at least) comprises an inductive receiver (i.e. an inductive coil, which is inductively coupled to a corresponding coil in a transceiver of the audio gateway device (ID)), which is adapted to receive the audio signal from the audio gateway device, and to extract the audio signal for use in the listening device. The inductive link between the audio gateway device and the listening device(s) is indicated to be one-way, but may alternatively be two-way (e.g. to be able to exchange control signals between the devices, e.g. to agree on an appropriate transmission channel). An audio gateway device, which may be modified and used according to the present disclosure is e.g. described in EP 1 460 769 A1, EP 1 981 253 A1 and in WO 2009/135872 A1.

FIG. 4 shows two embodiments of an audio processing system according to the present disclosure, each comprising an audio delivery device (ADD) and a binaural listening system comprising first and second listening devices (LD1, LD2, LD2 being assured to be identical to LD1 as indicated by the 'shadow' of LD1 denoted LD2).

Figure 4A:
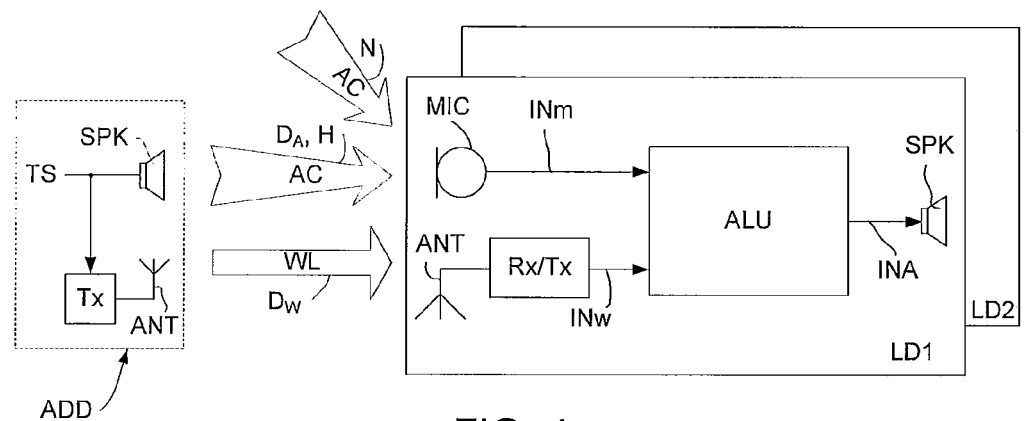
FIG. 4 shows two embodiments of an audio processing system comprising an audio delivery device and a binaural listening system comprising first and second listening devices, the audio delivery device of FIG. 4a comprising a loudspeaker for acoustically propagating a target signal and a wireless transmitter for wirelessly transmitting said target signal, the audio delivery device of FIG. 4b comprising a microphone for picking up a target signal from a speaker and a wireless transmitter for transmitting said target signal.

The audio delivery device (ADD) of FIG. 4a comprises a loudspeaker (SPK) for acoustically propagating a target signal TS (cf. arrow AC denoted $D_A$, H, indicating a link delay $D_A$ and transfer function H, respectively, for the propagation from source to listener) and a wireless transmitter (Tx, ANT) for wirelessly transmitting said target signal to listening devices LD1 and LD2 of a binaural listening system (cf. arrow WL denoted $D_w$, indicating a link delay $D_w$).

In the embodiment of FIG. 4a, the listening devices (LD1, LD2) each comprise an input transducer (MIC) for converting a received propagated acoustic signal to a propagated electric signal INm, the received propagated acoustic signal comprising the target signal and possible other sounds from the environment (noise). Each of the listening devices further comprise a wireless receiver (ANT, RX/Tx) for receiving the wirelessly transmitted signal and for retrieving a streamed target audio signal INw. The listening devices each further comprise an alignment unit (ALU) for aligning the streamed target audio signal (INw) with the propagated electric signal (INm) to provide aligned streamed target audio signals (INA) in the respective listening devices for presentation to a user via an output transducer (here loudspeaker) (SPK). The streamed audio signal is aligned with the acoustically propagated signal in both listening devices, thereby applying the 'normal' temporal cues to the streamed signal to indicate a direction of origin of the audio source relative to the listener. In case the wirelessly transmitted signal 'arrives' before the acoustically propagated signal at both ears/listening devices (cf. e.g. FIG. 3b), it is only necessary to appropriately delay the wirelessly received signal in the two listening devices (i.e. it is not necessary to exchange information between the two listening devices) to provide the spatial cues. In an embodiment, the wirelessly received signal in each of the left and right listening devices is delayed compared to the time of arrival of the acoustically received signal with an identical amount (in some cases, preferably as little as possible).

Figure 4B:
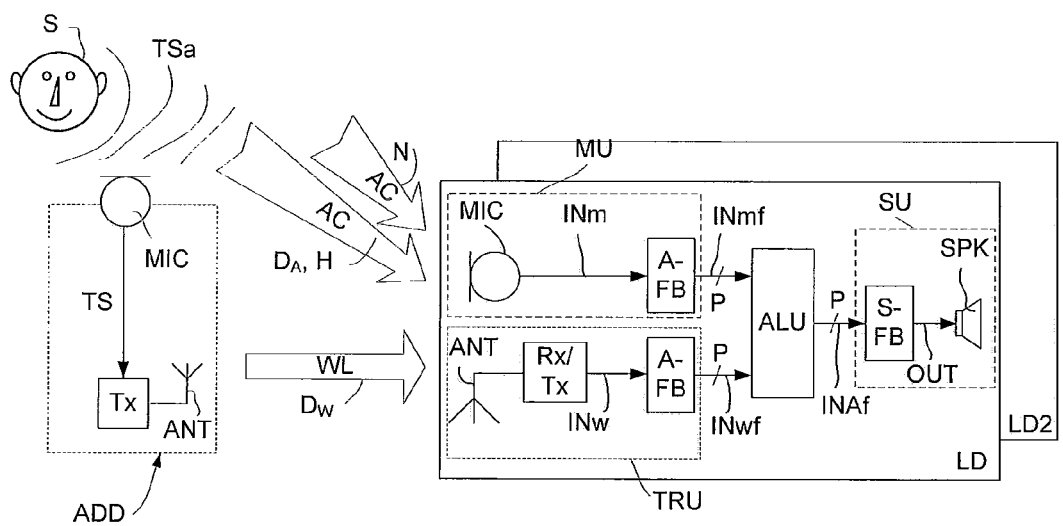

The audio delivery device (ADD) of FIG. 4b comprises a microphone (MIC) for picking up a target signal TS from a speaker (S) and a wireless transmitter (Tx, ANT) for transmitting said target signal to listening devices LD1 and LD2 of a binaural listening system (cf. arrow WL denoted $D_w$, indicating a link delay $D_w$). The acoustic version of the target signal TSa as picked up by the microphone (MIC) is (here) acoustically propagated without amplification to the listening devices (LD1, LD2) (cf. arrow AC denoted $D_A$, H, indicating a link delay $D_A$ and transfer function H, respectively, for the propagation from source to listener). In addition to the wirelessly transmitted and acoustically propagated signals comprising the target signal, other sound sources may be present in the environment of the user wearing the listening devices (cf. arrow AC denoted N (noise)).

In addition to the components described in connection with FIG. 4a, the embodiment of the listening devices (LD1, LD2) in FIG. 4b each comprise analysis (A-FB) and synthesis (S-FB) filter banks for providing the input signals INm, INw in a time-frequency representation INmf, INwf, respectively, (allowing individual analysis and processing of the input signal in a number (P) of frequency bands), which are connected to the alignment unit (ALU). Determination of delay differences between the input signals INm, INw in the alignment unit in the frequency domain advantageously provides an increased time resolution (compared to analysis in the time domain). The alignment unit provides an aligned streamed target audio signal (INAf) in the time-frequency domain, which is fed to synthesis filter bank (S-FB) to be converted to an output signal OUT in the time domain for presentation to a user via the output transducer, e.g. a loudspeaker, (SPK). The input transducer, e.g. a microphone or microphone system comprising several microphones, (MIC) is indicated to form part of a microphone unit (MU) together with analysis filterbank (A-FB). Similarly, the wireless receiver (ANT, RX/Tx) is indicated to form part of a (transmitter/)receiver unit (TRU) together with analysis filterbank (A-FB). In addition, other relevant functionality may be included in these units, e.g. analogue to digital conversion (AD). In the embodiment of FIG. 4b the signals of the forward path from input to output transducer are converted to the frequency domain. Alternatively only selected parts of the forward (and/or a possible analysis path) may be represented in the frequency domain.

Figure 5A:
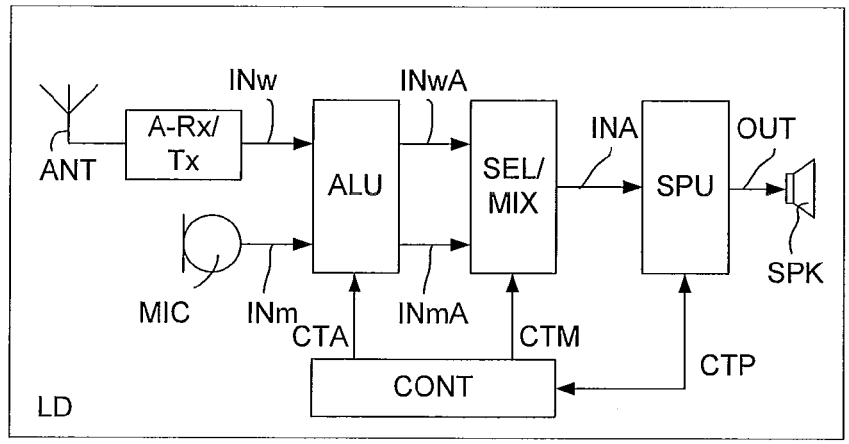
FIG. 5 shows three embodiments of a listening device of a binaural listening system, FIG. 5a illustrating an embodiment comprising a mixing unit, FIG. 5b illustrating an embodiment comprising an interaural transceiver, and FIG. 5c illustrating an embodiment comprising a feedback cancellation system.

FIG. 5a shows an embodiment of a listening device LD as described in FIG. 4a suitable for use in a binaural listening system according to the present disclosure, but additionally comprising a selector/mixer unit (SEL/MIX) for selecting one of the aligned acoustically propagated and aligned wirelessly transmitted signals INmA and INwA, respectively, or a mixture of the two. Typically only one of the input signals INmA and INwA to the alignment unit (ALU) will be 'aligned' in the sense 'actively delayed' (depending on the practical setup) but the term 'aligned signal' is used for both resulting signals, INmA and INwA, intended to be 'aligned in time'. In an embodiment, the aligned streamed target audio signal is mixed, e.g. by addition of an attenuated version of the propagated electric signal to thereby add 'acoustic coloring' from the environment wirelessly received signal. The resulting output INA of the selector/mixer unit (e.g. comprising an aligned version of the wirelessly received signal or an improved version thereof, e.g. comprising signal components from the acoustically propagated signal) is fed to a signal processing unit (SPU) for further processing (e.g. by applying noise reduction, amplification, compression or other algorithms for enhancement of the input signal). The embodiment of a listening device (LD) shown in FIG. 5a further comprises a control unit (CONT) for coordinating the control of the alignment unit (ALU), the selector/mixer unit (SEL/M/X) and the signal processing unit (SPU) by means of control signals CTA, CTM and CTP, respectively. The processed output signal OUT of the signal processing unit (SPU) is fed to the output transducer (SPK) for being presented to a user.

Figure 5B:
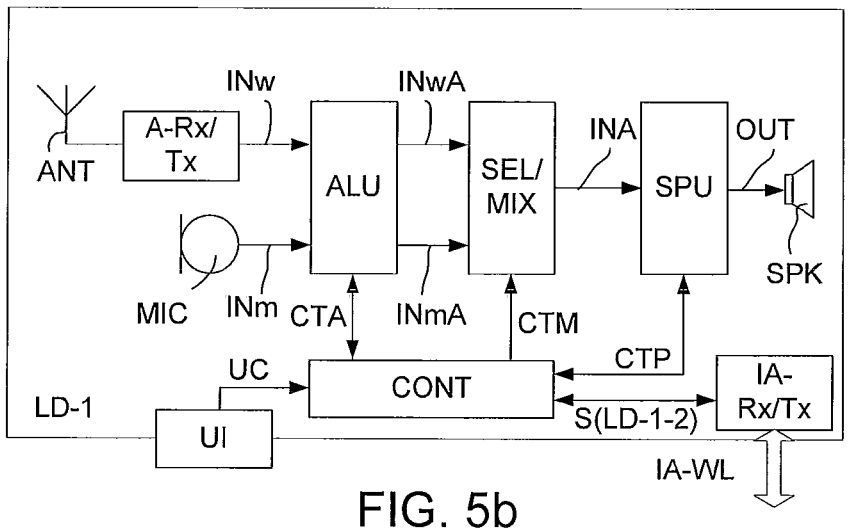

FIG. 5b illustrates an embodiment of a listening device (LD-1) as described in connection with FIG. 5a, but further comprising a user interface (UI) for influencing or controlling the alignment unit (ALU, via signal CTA) and/or the selector/mixer unit (SEL/MIX, via signal CTM) and/or the signal processing unit (SPU, via signal CTP). The embodiment of FIG. 5b further comprises an interaural transceiver (IA-Rx/Tx) for exchanging information (signals S(LD-1-2)) with the contralateral listening device (LD-2, not shown) of a binaural listening system. The user interface (UI, e.g. a remote control or an activation element on one or both listening devices of the system) is adapted to allow a user to enter an 'add cue' mode (program) where the application of directional cues to the streamed target audio signal is activated. The user interface (UI) may additionally be adapted to initiate a delay calibration procedure. The exchange of information between the two listening devices of a binaural listening system via an interaural link (cf. transceivers IA-Rx/Tx) allows the calculation of an angle of incidence of the signal from an acoustic source.

Figure 5C:
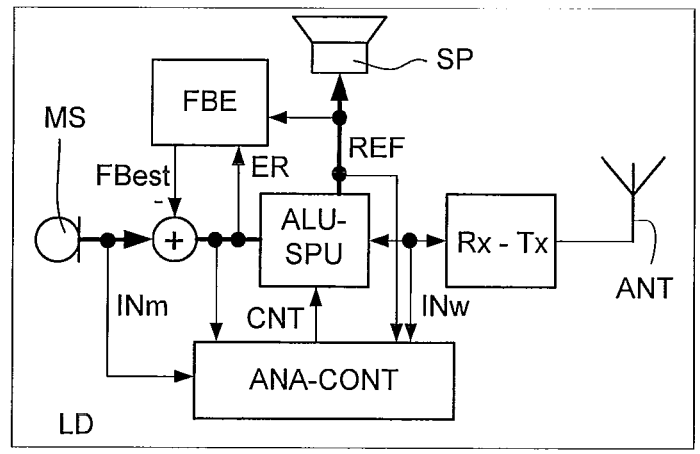

FIG. 5c shows an embodiment of a listening device (LD), e.g. a hearing instrument, for use in a binaural listening system according to the present disclosure, the listening device comprising a forward path from an input transducer (MS) to an output transducer (SP), the forward path comprising a processing unit (ALU-SPU) for processing (e.g. applying directional cues and a time and frequency dependent gain to) an input signal INm picked up by the input transducer (here microphone system MS), or a signal derived therefrom (here feedback corrected signal ER), and providing an enhanced signal REF to the output transducer (here speaker SP). The forward path from the input transducer to the output transducer is indicated with a bold line. The embodiment of a listening device shown in FIG. 5c comprises a feedback cancellation system for reducing or cancelling acoustic feedback from an 'external' feedback path from the output transducer (SP) to the input transducer (MS) of the listening device. The feedback cancellation system comprises a feedback estimation unit (FBE) for estimating the feedback path and sum unit ('+') for subtracting the feedback estimate FBest from the input signal INm, thereby ideally cancelling the part of the input signal that is caused by feedback. The resulting feedback corrected input signal ER is further processed by the signal processing unit (ALU-SPU). The processed output signal from the signal processing unit, termed the reference signal REF, is fed to the output transducer (SP) for presentation to a user. The listening device further comprises a wireless receiver (ANT, RX-Tx) for receiving the wirelessly transmitted signal and for retrieving a streamed target audio signal INw that is fed to the signal processing unit (ALU-SPU). An analysis and control unit (ANA-CONT) receives signals from the forward path (here acoustically propagated input signal INm, feedback corrected input signal ER, reference signal REF, and wirelessly received target audio signal INw). The analysis and control unit (ANA-CONT) provides a control signal CNT to the signal processing unit (ALU-SPU) for controlling or influencing the processing in the forward path. The algorithms for processing an audio signal, including the alignment procedure of the present disclosure, are executed fully or partially in the signal processing unit (ALU-SPU) and the analysis and control unit (ANA-CONT). The input transducer (MS) is representative of a single microphone or a microphone system comprising a number of microphones, the microphone system allowing to modify the characteristic of the system in one or more spatial directions (e.g. to focus the sensitivity in a forward direction of a user (attenuate signals from a rear direction of the user)). The input transducer may comprise a directional algorithm allowing the separation of one or more sound sources from the sound field. Such directional algorithm may alternatively be implemented in the signal processing unit. The input transducer may further comprise an analogue to digital conversion unit for sampling an analogue input signal and provide a digitized input signal. The input transducer may further comprise a time to time-frequency conversion unit, e.g. an analysis filter bank, for providing the input signal in a number (P) of frequency bands allowing a separate processing of the signal in different frequency bands. Similarly, the output transducer may comprise a digital to analogue conversion unit and/or a time-frequency to time conversion unit, e.g. a synthesis filter bank, for generating a time domain (output) signal from a number of frequency band signals. A correlation unit comprising a memory (buffer) for storing a time sequence of an audio signal corresponding to a predefined time, the predefined time being e.g. larger than an estimated maximum delay difference (processing and propagation delay) between the acoustically and wirelessly propagated signals in question for the application envisioned is implemented fully or partially in the analysis unit (ANA-CONT) or the signal processing unit (ALU-SPU). Preferably a time sequence of the acoustically propagated signal (INm and/or of the feedback corrected input signal ER) is or can be stored in a first part of the memory and a time sequence of the streamed target audio signal (INw) retrieved from the wirelessly received signal (via antenna ANT and transceiver Rx-Tx) is or can be stored in a second part of the memory. The correlation measurement unit is adapted for determining a correlation between the streamed target audio signal (INw) and the acoustically propagated signal (INm) picked up by the input transducer (MS) and to provide an estimated time lag k between two signals. The time lag is applied to the relevant of the two signals to provide that the two signals coincide in time. The listening device is adapted to provide that the aligned streamed target audio signal is processed in the signal processing unit to achieve that the same relative timing that the acoustically propagated signals exhibit when picked up by the input transducers of left and right listening devices of a binaural listening system worn by a user and as described by the embodiments of the present disclosure is applied to the streamed target audio signals before being presented to the user.

FIG. 6 shows three embodiments of a listening device for use in a binaural listening system. All embodiments comprise the components described in connection with the listening device of FIG. 4a, namely an input transducer (MIC) for converting a received propagated acoustic signal to a propagated electric signal INm, a wireless receiver (ANT, A-MUTx) for receiving the wirelessly transmitted signal and for retrieving a streamed target audio signal INw, an alignment unit (ALU) for aligning the streamed target audio signal (INw) with the propagated electric signal (INm) to provide aligned streamed target audio signals (INwd=OUT) for presentation to a user via an output transducer (here loudspeaker) (SPK). All four embodiments illustrate details of the alignment unit (ALU) within the solid thin frame. The alignment unit (ALU) receives the propagated electric signal INm and the streamed target audio signal INw as inputs, each input signal being fed to a variable delay unit (DEL) allowing a delay to be applied to the input signal in question controlled by a correlation and control unit (COR-CNT) using control signals DmC and DwC, respectively. The correlation and control unit (COR-CNT) receives the propagated electric signal INm and the streamed target audio signal INw and their respective delayed versions as inputs and comprises appropriate memory units for storing any of the propagated electric signal INm and the streamed target audio signal INw, when necessary. To identify which of the two signals arrive first at a given point in time, time sequences of both signals are stored and a delay or lag between the two signals is varied between a predefined minimum value and a predefined maximum value (without necessarily assuming that a particular one of the signals lag the other), such variation being e.g. performed in steps, and a correlation measure is calculated for each value of the time lag between the signals. When a maximum correlation is found for a given time lag, that time lag is assumed to represent the time lag (with sign) between the two signals. Such time lag estimation can e.g. be determined each time a particular mode of operation of the listening device (a particular program) is entered, or on the request of the user via a user interface, or at regular time intervals, or when predefined criteria concerning the sound environment are fulfilled. In an embodiment, the system is adapted to, depending on a predefined criterion, either start the procedure for estimating a time lag between the wirelessly transmitted and the acoustically propagated signal from a previously determined delay value or under the assumption of no prior knowledge of the mutual timing relationship. In an embodiment, the system is adapted to start the procedure for estimating a time lag between the wirelessly transmitted and the acoustically propagated signal dependent on a value of a sensor, e.g. a motion sensor monitoring movements of the users head, and/ or an output from a directionality algorithm monitoring movements of an audio source relative to the user.

Figure 6A:
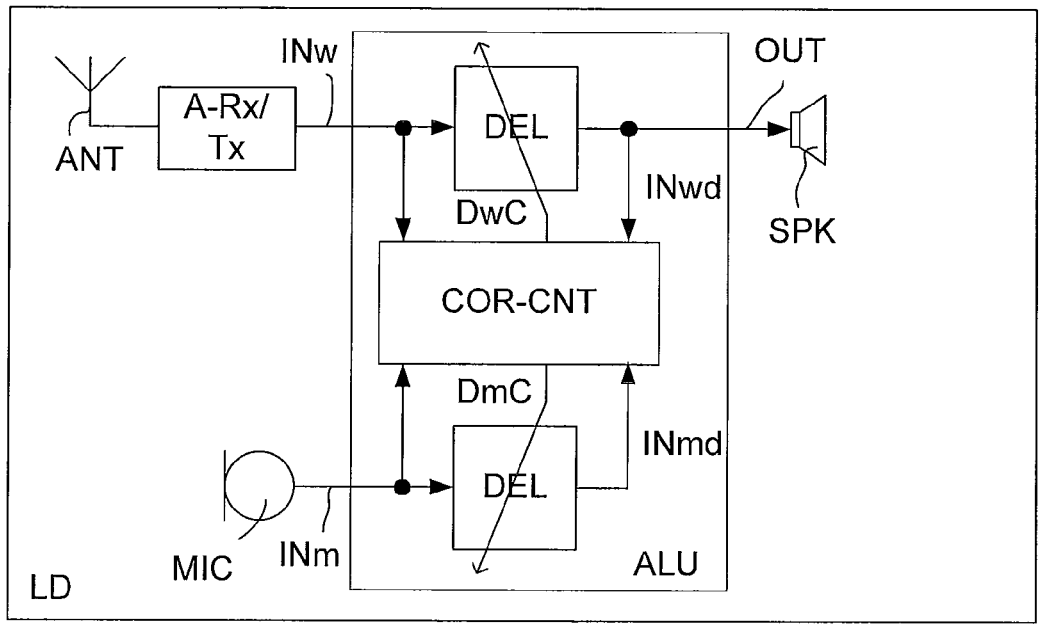
FIG. 6 shows three embodiments of a listening device for use in a binaural listening system, FIG. 6a illustrating an embodiment showing details of an alignment unit, FIG. 6b illustrating an embodiment additionally comprising a wireless receiver for receiving a signal from a contralateral listening device of a binaural listening system, FIG. 6c illustrating an embodiment comprising an interaural transceiver for exchanging information with contralateral listening device of a binaural listening system.
Figure 6B:
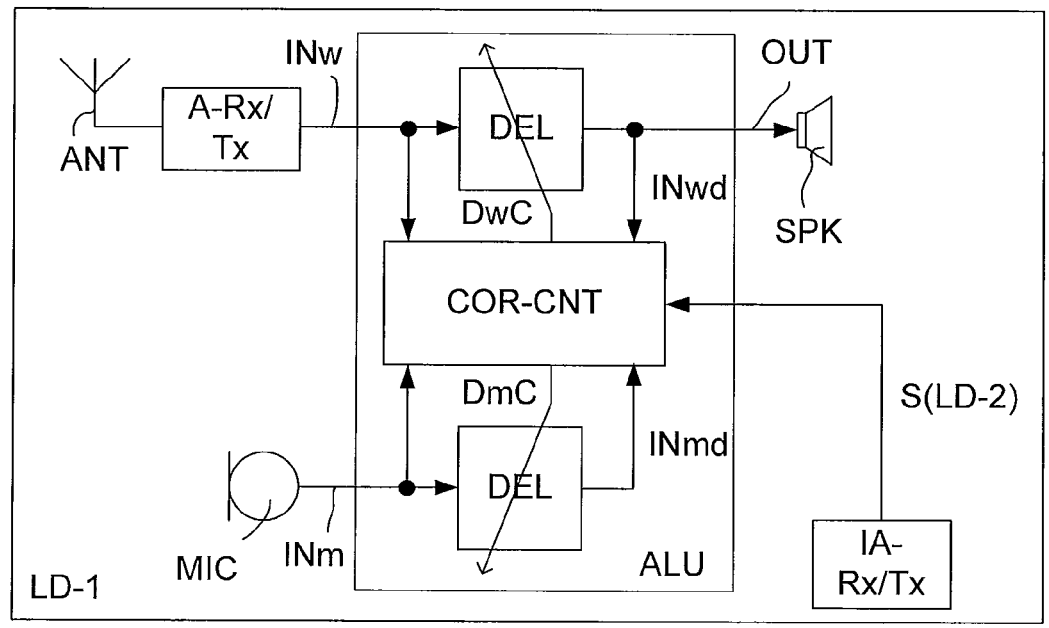
Figure 6C:
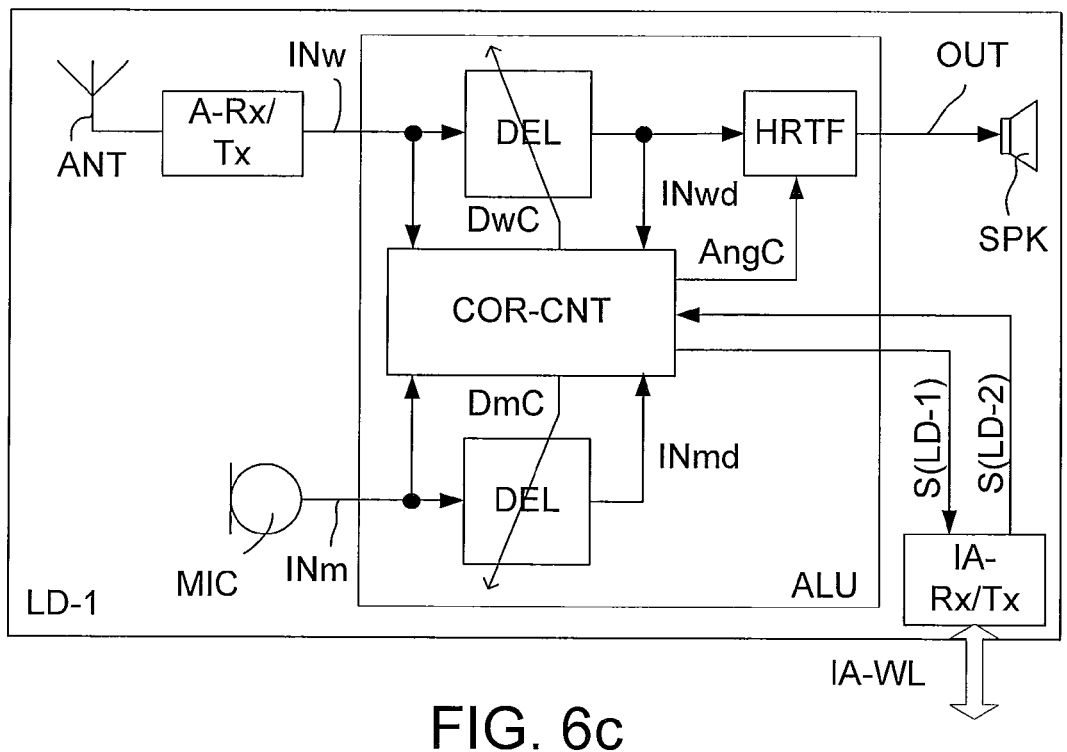

FIG. 6a illustrates an embodiment of a listening device (LD) comprising the above mentioned basic components and properties, where the listening devices of a binaural listening system comprises first and second such listening devices that align their respective streamed target audio signals independently of each other (possibly based on a common clock). FIG. 6b illustrates an embodiment of a listening device (LD-1), which—compared to that of FIG. 6a-additionally comprises a wireless receiver (IA-Rx/Tx) for receiving a signal S(LD-2) from a contralateral listening device (LD-2, not shown) of a binaural listening system. The signal from the other listening device (LD-2) comprises e.g. information about the lag between the wirelessly transmitted and the acoustically propagated signal as received at that device and/ or information defining a common clock between the two devices. FIG. 6c illustrates an embodiment of a listening device (LD-1) comprising an interaural transceiver (IA-Rx/ Tx) for exchanging information (signals S(LD-1), S(LD-2)) with the contralateral listening device (LD-2, not shown) of a binaural listening system. Information concerning the time lag ($k_1$, $k_2$) of the propagated electric signal and the streamed target audio signal at the first (LD-1) and second (LD-2) listening devices, respectively, is transmitted to (signal S(LD-1)) and received from (signal S(LD-2)), respectively, the second listening device (LD-2). The correlation and control unit (COR-CNT) uses the respective time lags (e.g. $T_{ac,1}-T_{radio}$ and $T_{ac,2}-T_{radio}$) to determine a current angle of incidence of the acoustic signals from the acoustic source, such angle of incidence being represented by control signal AngC. The listening device (LD-1 and possibly LD-2) comprise a unit HRTF in the forward path for applying relevant head related transfer functions to the aligned streamed target audio signal INwd before being forwarded to the speaker (SPK) for presentation to the user. This has the advantage of further improving the sense of direction of the acoustic source A database of head related transfer functions (HRTF) is preferably stored in the listening device prior to its normal operation, e.g. as HRTF($\phi$), $\phi$ being the angle of incidence of the acoustic signal, cf. e.g. [Gardner and Martin, 1994] for examples of HRTFs for a model head. Alternatively, HRTF values for the particular user can be measured and stored in the listening device prior to its operational use.

Figure 7:
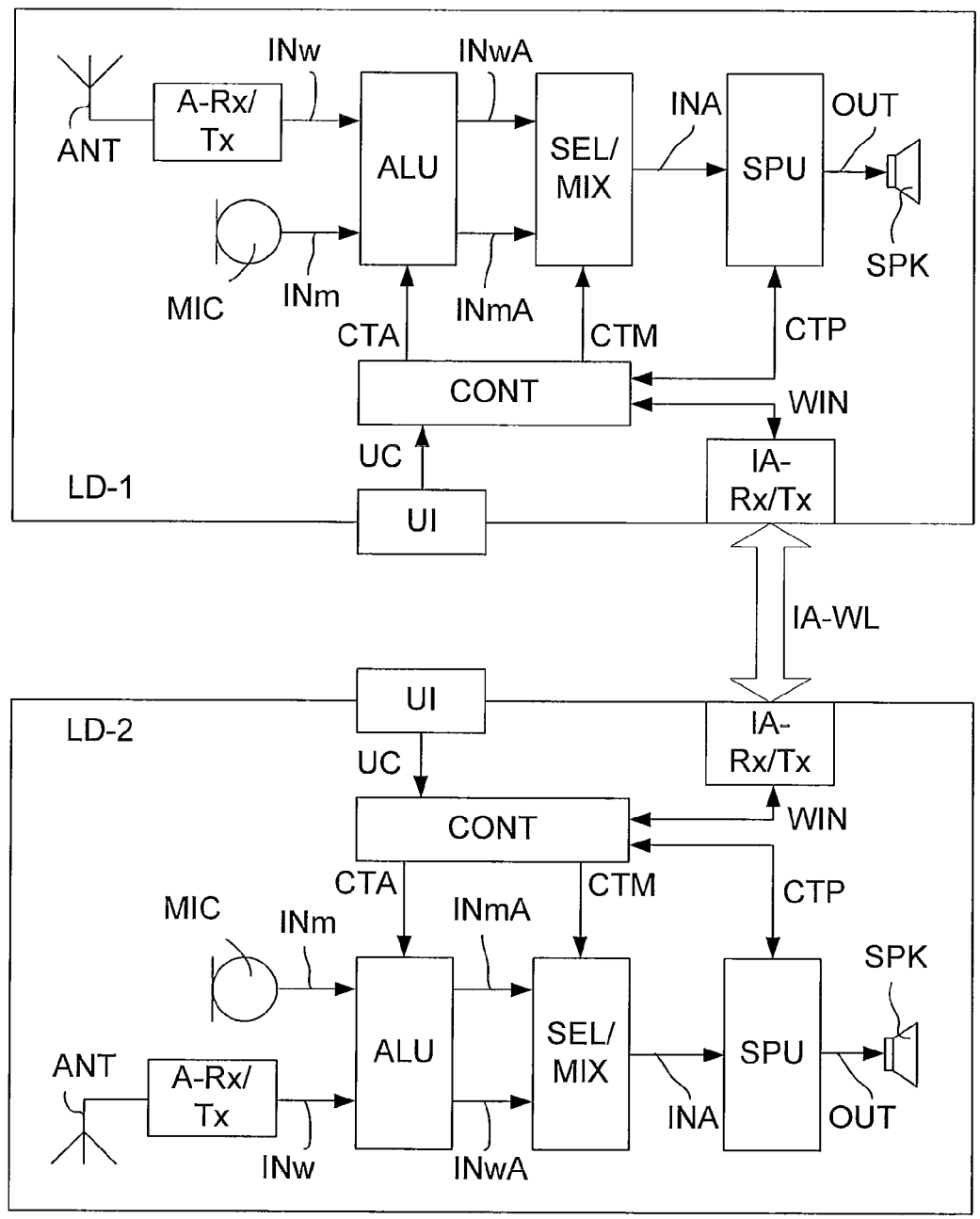
FIG. 7 shows an embodiment of a listening system, e.g. a binaural hearing aid system, comprising first and second listening devices, e.g. hearing instruments.
Figure 8A:
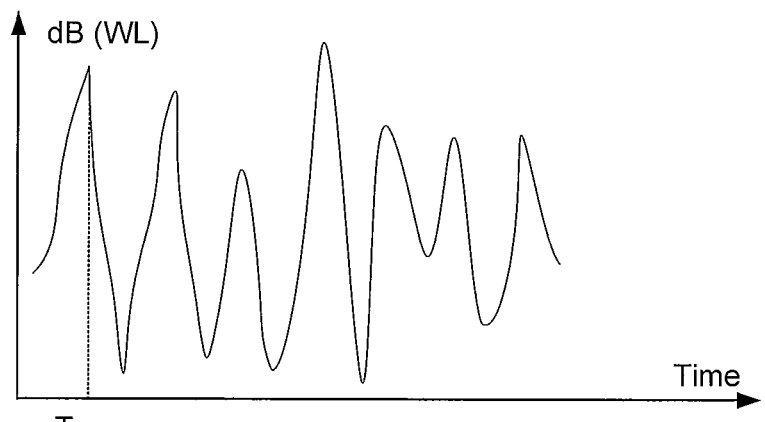
FIG. 8 shows schematic examples of a wirelessly received target signal (FIG. 8a), and acoustically propagated signals (theoretically) via direct ($p_0$) and reflected propagation paths ($p_1$, $p_2$) (FIGS. 8b, 8c, 8d, respectively), indicating mutual relative time lags, for the setup shown in FIG. 9a, FIG. 9 shows in FIG. 9a an example of direct and reflected acoustic propagation paths from a speaker to a listener resulting in direct and echo signals as illustrated in FIGS. 8b. 8c, 8d, and in FIG. 9b an example of a resulting correlation measure estimating the correlation between a wirelessly transmitted and the acoustically propagated signal (sum of the three signals in FIG. 8b-8d) as a function of the time lag between the two signals.
Figure 8B:
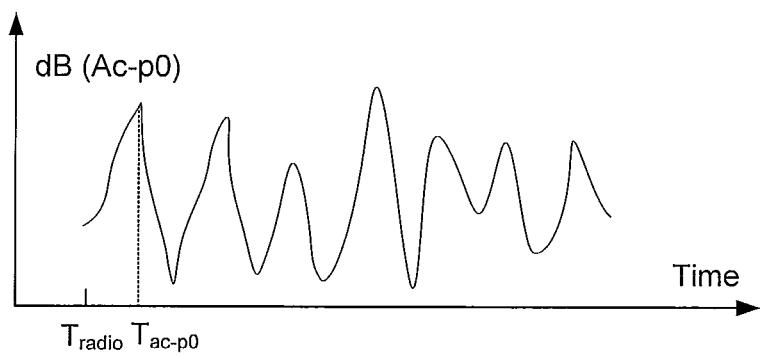
Figure 8C:
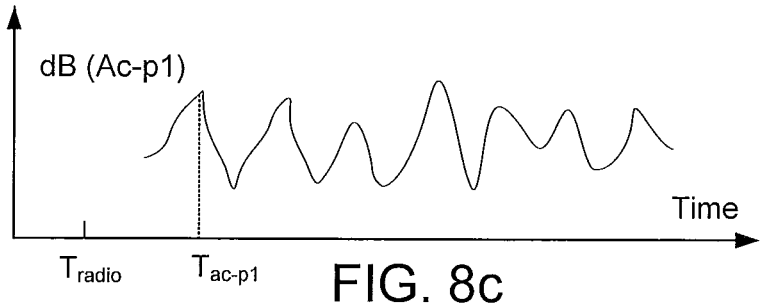
Figure 8D:
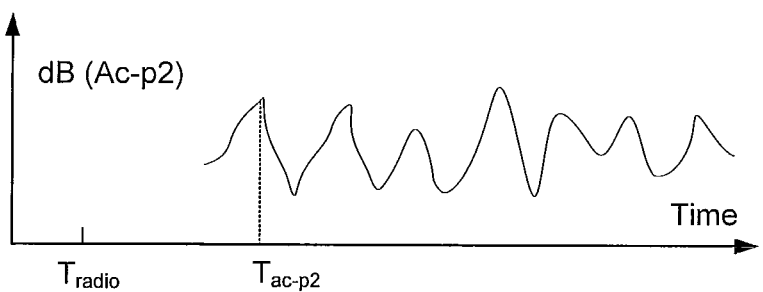

FIG. 7 shows an embodiment of a binaural listening system, e.g. a binaural hearing aid system, comprising first and second listening devices (LD-1, LD-2), here termed hearing instruments. The first and second hearing instruments are adapted for being located at or in left and right ears of a user. Each hearing instrument LD-1 and LD-2 is shown as an embodiment of a listening devise as described in connection with FIG. 5b. Alternatively, other embodiments of listening devices according to the present disclosure (as e.g. shown in FIG. 4-6, possibly amended to include an interaural wireless link) may be used. The hearing instruments are adapted for exchanging information between them via a wireless communication link, e.g. a specific inter-aural (IA) wireless link (IA-WO. The two hearing instruments (LD-1, LD-2) are adapted to allow the exchange of status signals, e.g. including the transmission of characteristics of the respective input signals (including information related to a delay between the acoustically propagated and received and the wirelessly received signals) received by a device at a particular ear to the device at the other ear. To establish the inter-aural link, each hearing instrument comprises antenna and transceiver circuitry (here indicated by block IA-Rx/Tx). Each hearing instrument LD-1 and LD-2 comprise a forward signal path comprising two input transducers, one comprising a microphone or microphone system (MIC) and the other comprising a wireless receiver unit (ANT, A-Rx/Tx), the forward path further comprising an alignment unit (ALU), a selector or mixer unit (SEL/MDC), a signal processing unit (SPU) and a speaker unit (SPK). In the binaural hearing aid system of FIG. 7, a signal WIN (signal S(LD-1-2) in FIG. 5b) comprising delay-information (and possibly other information) generated by control unit (CONT) of one of the hearing instruments (e.g. LD-1) is transmitted to the other hearing instrument (e.g. LD-2) and/or vice versa for use in the respective other control unit (CONT) and possibly for control of the respective other signal processing unit (SPU). Appropriate delays are inserted in the output signals OUT of the respective listening devices to be presented to the user to convey a spatial impression of the location of the acoustic source (transmitting device) relative to the user.

The information and control signals from the local and the opposite device (exchanged via the inter-aural wireless link (IA-WL)) may in some cases be used together to influence a decision or a parameter setting in the local device. The control signals may e.g. comprise information that enhances system quality to a user, e.g. improve signal processing, e.g. information relating to a classification of the current acoustic environment of the user wearing the hearing instruments, synchronization (e.g. providing a common clock), etc. The information signals may e.g. comprise directional information and/or the contents of one or more frequency bands of the audio signal of a hearing instrument for use in the opposite hearing instrument of the system. Each (or one of the) hearing instruments comprises a manually operable user interface (UI) for generating a control signal UC e.g. for providing a user input to the control unit (e.g. for activating or deactivating an 'add cue' mode wherein spatial cues are added to the streamed audio signal). Alternatively or additionally, the user interface may be used for initiating a calibration of the delay estimate between the acoustic and wirelessly received signals of the respective listening devices. Such user interface may alternatively be implemented in a remote control device.

The hearing instruments (LD-1, LD-2) each comprise wireless transceivers (ANT, A-Rx/Tx) for receiving the wirelessly transmitted signal comprising a target signal from an audio delivery device (e.g. a wireless microphone, e.g. M in FIG. 1-3) or relayed from an auxiliary device (e.g. an audio gateway device, e.g. ID in FIG. 3a). The hearing instruments each comprise a selector/mixer unit (SEL/MIX) for selecting either of the input audio signal INm from the microphone or the input signal INw from the wireless receiver unit (ANT, A-Rx/Tx) or a mixture thereof, providing as an output a resulting input signal IN. In an embodiment, the selector/ mixer unit can be controlled by the user via the user interface (UI), cf. control signal UC and/or via a control signal embedded in the wirelessly received input signal. The link for receiving the streamed audio signal from an audio source and the interaural link for exchanging information between the listening devices of a binaural listening system may in a given listening device be implemented by the same transceiver (e.g. if some sort of priority scheme between simultaneously received audio signals and information exchange signals is implemented). Similarly, the user interface may include a wireless link from a remote control (RC) device to each of the listening devices. Such RC-link may be implemented by the wireless receiver unit (ANT, A-Rx/Tx) or by the interaural transceiver unit (IA-Rx/Tx) or by an integration of said transceivers.

Figure 9A:
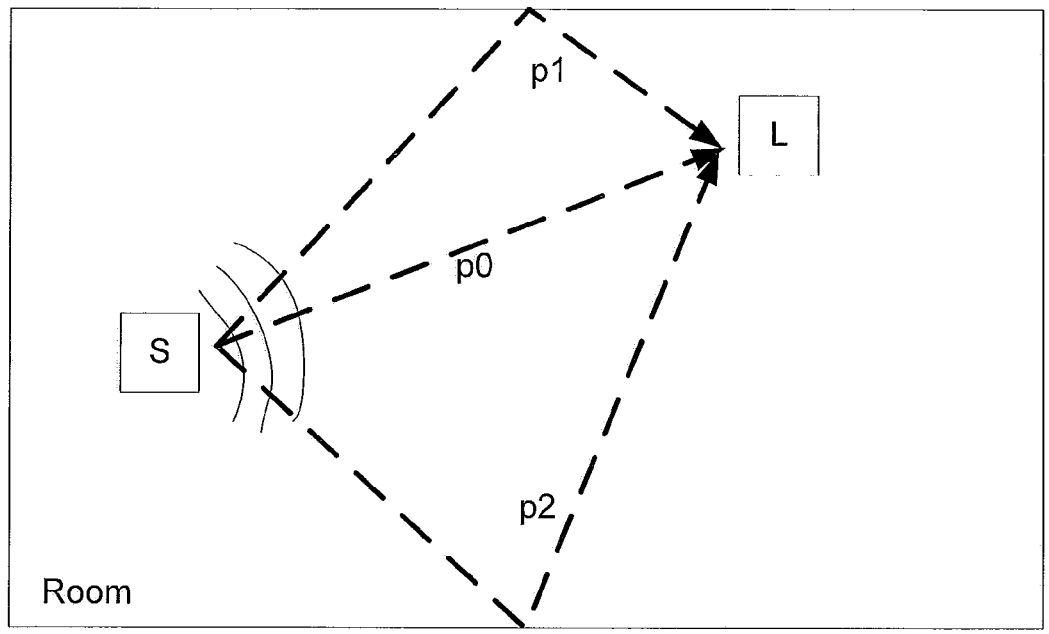
Figure 9B:
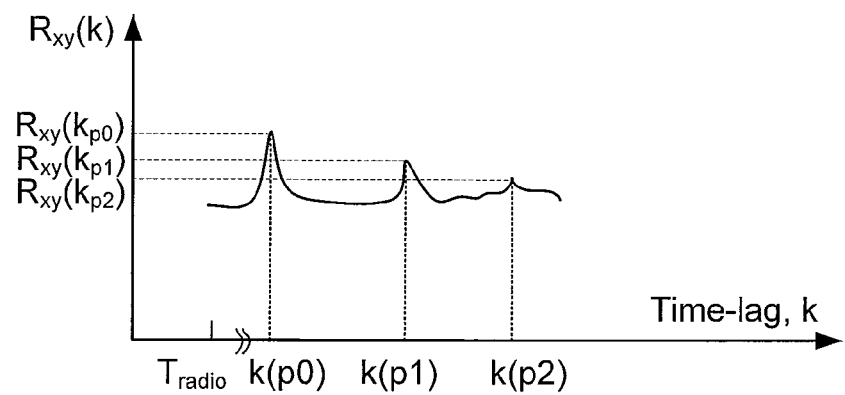

FIG. 8 shows schematic examples of a wirelessly received (streamed) target signal (FIG. 8a), and acoustically propagated signals (theoretically) via direct ($p_0$) and reflected propagation paths ($p_1$, $p_2$) (FIGS. 8b, 8c, 8d, respectively), indicating mutual relative time lags, for the setup shown in FIG. 9a. The intention is that the resulting acoustically propagated signal received by a listening device (at L in FIG. 9a) is a sum of the three (and possibly more, depending on the room) differently delayed and attenuated (and possibly otherwise distorted) contributions schematically illustrated in FIGS. 8b, 8c, and 8d. FIG. 9a shows an assumed arrangement in an exemplary location (Room) of direct ($p_0$) and reflected acoustic propagation paths ($p_1$, $p_2$) from a speaker (S) to listener (L) resulting in direct and echo signals as illustrated in FIGS. 8b, 8c, 8d. FIG. 9b schematically illustrates an example of a resulting correlation measure $R_{xy}$, estimating the correlation between a wirelessly transmitted (x) (signal in FIG. 8a) and the acoustically propagated (y) signal (the latter being the sum of the three signals in FIG. 8b-8d) as a function of the time lag between the two signals. The resulting time lag k (for a given listening device) used to apply to the streamed target audio signal can e.g. be the time lag $k(p_0)$ for the direct path $p_0$. Having identified, at a given point in time, an observed time lag, a tracking mechanism is preferably used to track the possible movement of the maximum in the correlation function (see e.g. [Affes & Grenier, 1997]) to minimize processing efforts. Preferably, such tracking mechanism is used until a predefined criterion for the deviation from the original value (e.g. the size of $Rxy(k(p_0))$ and/or $k(p_0)$) is fulfilled. When the predefined ('reset') criterion is fulfilled, a new independent calibration procedure is preferably initiated.

Figure 10A:
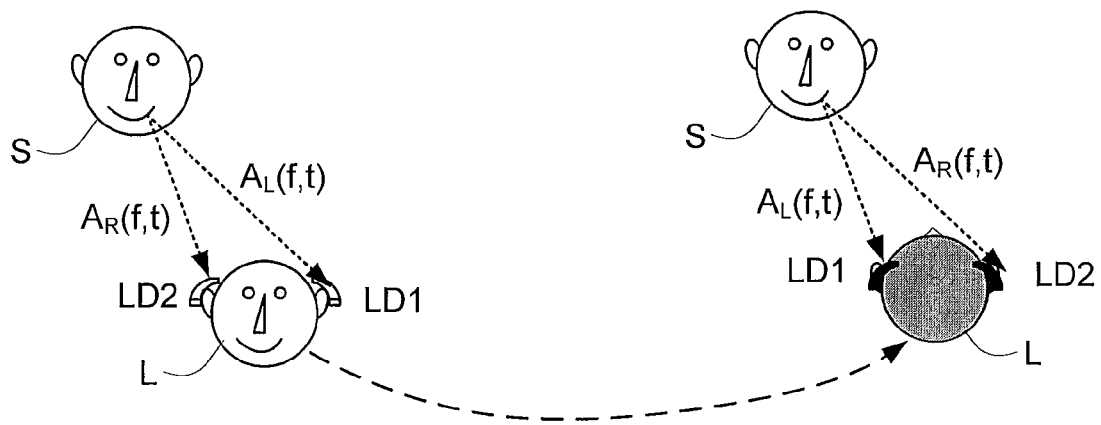
FIG. 10 shows in FIG. 10a an example of an application scenario, where a user rotates 180° (or turns his head from one side to the other) and in FIG. 10b a corresponding change in the time lags between the wirelessly and acoustically received signals in the two listening devices.
Figure 10B:
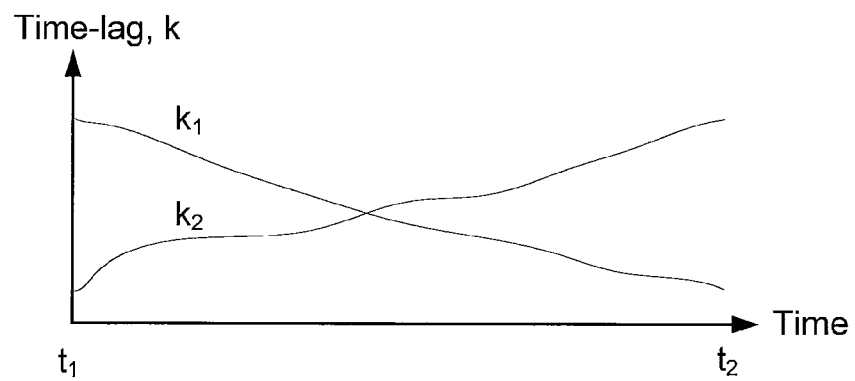

FIG. 10a shows an example of an application scenario wherein a user rotates approximately 180° (or turns his head from one side to the other). Thereby the relative lengths of the (direct) acoustic paths from audio source (speaker S) to respective listening devices (LD1, LD2) worn by user (L) change (in the left situation, the acoustic path to LD1 is the longer, whereas in the right situation, the acoustic path to LD2 is the longer). This results as illustrated in FIG. 10b in a corresponding change in the time lags k between the wirelessly and acoustically received signals in the two listening devices. FIG. 10b shows that the time lag $k_1$ of the left listening device (LD1) decreases from a relatively higher value during the users' head movement from position 1 (left in FIG. 10) at time $t_1$ to a relatively lower value in position 2 (right in FIG. 10) at time $t_2$. The opposite behaviour is observed for the time lag $k_2$ of the right listening device (LD2). During such gradual change of the respective time lags, a tracking mechanism for a (previously) stable time lag can advantageously be used to track the time variation of the time lags. The time range from $t_1$ to $t_2$ can e.g. be of the order of seconds.

The invention is defined by the features of the independent claim(s). Preferred embodiments are defined in the dependent claims. Any reference numerals in the claims are intended to be non-limiting for their scope.

Some preferred embodiments have been shown in the foregoing, but it should be stressed that the invention is not limited to these, but may be embodied in other ways within the subject-matter defined in the following claims.

REFERENCES

WO 2010/133246 A1 (OTICON)
[Schaub; 2008] Arthur Schaub, Digital hearing Aids, Thieme Medical. Pub., 2008.
U.S. Pat. No. 5,473,701 (AT&T)
WO 99/09786 A1 (PHONAK)
EP 2 088 802 A1 (OTICON)
WO 2005/052911 A1 (OTICON)
EP 0746960 A1 (Møller et al.)
[Gardner and Martin, 1994] Gardner, Bill and Martin, Kieth, *HRTF Measurements of a KEMAR Dummy-Head Microphone*, MIT Media Lab Machine Listening Group, MA, US, 1994.
WO 03/081947 A1 (OTICON)
U.S. Pat. No. 5,144,675 (ETYMOTIC)
EP 1 460 769 A1 (PHONAK)
EP 1 981 253 A1 (OTICON)
WO 2009/135872 A1 (OTICON)
[Wang et al., 2006] s. Wang, D. Sen, W. Lu,
US 2009/052703 A1 (UNIVERSITY OF AALBORG) 26 Feb. 2009
[Affes & Grenier, 1997] S. Affes, Y. Grenier, A Signal Subspace Tracking Algorithm for Microphone Array Processing of Speech, IEEE Transactions on Speech and Audio Processing, Vol. 5, No. 5, September 1997, pp. 425-437.

The invention claimed is:

1. A binaural listening system, comprising:
   first and second listening devices adapted for being located at or in left and right ears, respectively, of a user, the binaural listening system being adapted for receiving
   a) a wirelessly transmitted signal comprising a target signal of an audio source and
   b) an acoustically propagated signal comprising the target signal as modified by respective first and second acoustic propagation paths from the audio source to the first and second listening devices, wherein
   the first and second listening devices each include an input transducer for converting received propagated first and second acoustic signals to first and second propagated electric signals in said first and second listening devices, respectively, each of the received propagated acoustic signals comprising the target signal and possible other sounds from the environment;
   the first and second listening devices each comprising a wireless receiver for receiving the wirelessly transmitted signal and for retrieving a first and second streamed target audio signal comprising the target audio signal from the wirelessly received signal in the first and second listening devices, respectively;
   the first and second listening devices each comprising an alignment unit for aligning the first and second streamed target audio signals with the first and second propagated electric signals in the first and second listening devices, respectively, to provide first and second aligned streamed target audio signals in the first and second listening devices, and to provide spatial cues to the wirelessly received signal, respectively, wherein
   the binaural listening system is configured to make the spatial cues available to the user dedicated mode of the system that is selectable by the user via a user interface or automatically selected based on a current acoustic environment, and the first and second listening devices include a mixing unit configured to mix an attenuated version of the propagated electric signal and the aligned streamed target audio signal to provide a mixed aligned signal as an output signal.

2. A binaural listening system according to claim 1, wherein each of the first and second listening devices comprise a hearing instrument, a headset, a headphone, an active ear protection device or a combination thereof.

3. A binaural listening system according to claim 1 adapted to establish a communication link between the first and second listening devices.

4. A binaural listening system according to claim 1, further comprising:
an auxiliary device, the system being adapted to establish a communication link between at least one of the listening devices and the auxiliary device.

5. A binaural listening system according to claim 1, wherein the alignment unit of each the respective first and second listening devices comprises a memory for storing a time sequence of an audio signal.

6. A binaural listening system according to claim 1 wherein the alignment unit comprises a correlation measurement unit for providing a correlation estimate representative of a correlation between two input signals.

7. A binaural listening system according to claim 1 wherein each of the first and second listening devices are adapted to determine a delay between a time of arrival of the first, second streamed target audio signals and the first, second propagated electric signals, respectively.

8. A binaural listening system according to claim 7 wherein the delays or delay differences in the first and second listening devices are determined in the frequency domain based on a sub-band analysis.

9. A binaural listening system according to claim 8 wherein the delay differences are determined in one or more predetermined frequency ranges, where directional cues are expected to be present.

10. A binaural listening system according to claim 6 comprising a tracking algorithm adapted for tracking a maximum of the correlation estimate.

11. A binaural listening system according to claim 3 wherein the alignment units of the first and second listening devices are adapted to decide whether the wirelessly transmitted signal arrives before the acoustically propagated signal at a respective listening device, and to communicate such information to the opposite listening device.

12. A method of enhancing an audio signal in a binaural listening system comprising first and second listening devices adapted for being located at or in left and right ears of a user, the method comprising:
acoustically propagating a target signal from an acoustic source along first and second acoustic propagation paths to said first and second listening devices, providing first and second propagated acoustic signals at the first and second listening devices, respectively, each of the first and second propagated acoustic signals comprising the target signal as modified by the respective first and second acoustic propagation paths from the acoustic source to the first and second listening devices, together with possible other sounds from the environment;
converting the received propagated first and second acoustic signals to first and second propagated electric signals in said first and second listening devices, respectively;
wirelessly transmitting a signal comprising the target audio signal to the first and second listening devices;
receiving the wirelessly transmitted signal in the first and second listening devices;
retrieving a first and second streamed target audio signal from the wirelessly received signal comprising the target audio signal in the first and second listening devices, respectively;
aligning the first streamed target audio signal with the first propagated electric signal in the first listening device to provide a first aligned streamed target audio signal and aligning the second streamed target audio signal with the second propagated electric signal in the second listening device to provide a second aligned streamed target audio signal to provide spatial cues to the wirelessly received audio signal, wherein said spatial cues are made available to the user in a dedicated mode of the system that is selectable by the user via a user interface or automatically selected based on a current acoustic environment; and
mixing the respective propagated electric signal and aligned streamed target audio signals to provide respective mixed aligned signals as output signals, wherein the aligned streamed target audio signals are mixed with attenuated versions of the respective propagated electric signals.

13. A method according to claim 12 comprising aligning the first streamed target audio signal with the first propagated electric signal in the first listening device to provide a first aligned streamed target audio signal by maximizing the cross-correlation between the first streamed target audio signal and the first propagated electric signal.

14. A method according to claim 12 comprising buffering at least one of the first streamed target audio signal and the first propagated electric signal.

15. A method according to claim 12 comprising determining a timing information defining the time difference between the arrival at the second listening device of the second streamed target audio signal and the second propagated electric signal and transmitting said timing information to the first listening device.

16. A method according to claim 12 comprising determining a timing information defining the time difference between the arrival at the first listening device of the first streamed target audio signal and the first propagated electric signal and transmitting said timing information to the second listening device.

17. A method according to claim 16 comprising determining a difference in time of arrival of the first and second propagated electric signals at the first and second listening devices, respectively.

18. A method according to claim 12 comprising storing in the first listening device a model of the head related transfer function as a function of the angle to an acoustic source.

19. A method according to claim 18 comprising calculating a contribution from the head related transfer function for the first listening device based on the difference in time of arrival of the first and second propagated electric signals at the first and second listening devices, respectively, or on a parameter derived therefrom.

20. A method according to claim 19 comprising applying the contribution from the head related transfer function for the first listening device to the first streamed target audio signal to provide an enhanced first streamed audio signal.

21. A method according to claim 12 comprising converting an electric signal derived from the first aligned streamed audio signal to an output signal perceivable by a user as an acoustic signal.

22. A method according to claim 12 comprising mixing the first or second propagated electric signal, respectively, with the first or second aligned streamed target audio signal to provide a mixed aligned signal as an output signal, wherein the first or second propagated electric signal is an attenuated version of the respective propagated electric signal.

23. A data processing system comprising a processor and tangible non-transitory media encoded with instructions that cause the processor to perform the steps of the method of claim 12.

* * * * *